(12) United States Patent
Wahl et al.

(10) Patent No.: US 7,885,419 B2
(45) Date of Patent: Feb. 8, 2011

(54) HEADSET TERMINAL WITH SPEECH FUNCTIONALITY

(75) Inventors: James Wahl, Export, PA (US); Andres Viduya, Cranberry Township, PA (US); Ben Kessing, Pittsburgh, PA (US); Roger Graham Byford, Apollo, PA (US); James Randall Logan, Pittsburgh, PA (US); Dominic Tooze, London (GB); Philip Shade, London (GB); Graham Lacy, London (GB)

(73) Assignee: Vocollect, Inc., Pittsburgh, PA (US)

( * ) Notice: Subject to any disclaimer, the term of this patent is extended or adjusted under 35 U.S.C. 154(b) by 1375 days.

(21) Appl. No.: 11/347,979

(22) Filed: Feb. 6, 2006

(65) Prior Publication Data

US 2007/0184881 A1     Aug. 9, 2007

(51) Int. Cl.
*H04R 1/10* (2006.01)
(52) U.S. Cl. .................. 381/74; 381/370; 455/575.2; 455/569.1
(58) Field of Classification Search ............. 455/575.2, 455/569.1; 381/379, 375, 372, 71.6, 370, 381/376, 377, 74; 705/29; 429/97, 98, 100
See application file for complete search history.

(56) References Cited

U.S. PATENT DOCUMENTS

| | | |
|---|---|---|
| 1,483,315 A | 2/1924 | Saal |
| D130,619 S | 12/1941 | Tresie et al. |
| D153,112 S | 3/1949 | Braun et al. |
| 2,506,524 A | 5/1950 | Stuck |
| 2,782,423 A | 2/1957 | Wiegand et al. |
| 2,958,769 A | 11/1960 | Bounds |
| 3,087,028 A | 4/1963 | Louis |
| D196,654 S | 10/1963 | Van Den Berg |

(Continued)

FOREIGN PATENT DOCUMENTS

DE     2628259     12/1977

(Continued)

OTHER PUBLICATIONS

International Search Report mailed Apr. 6, 2006.

(Continued)

*Primary Examiner*—Vivian Chin
*Assistant Examiner*—Friedrich Fahnert
(74) *Attorney, Agent, or Firm*—Wood, Herron & Evans, LLP

(57) ABSTRACT

A headset terminal for speech applications includes a headband assembly, an earcup assembly and a power source assembly. Processing circuitry is positioned in at least one of the earcup assembly and the power source assembly and includes speech processing circuitry for recognizing and synthesizing speech. A radio communicates with a central system to process the activity information of the headset terminal user. A rotatable microphone boom assembly includes controls mounted on opposite sides of a rotation axis to maintain a consistent orientation on the boom assembly with respect to the head of a user. The boom assembly snaps together with the earcup assembly to rotate. The headband assembly includes at least one transverse band and a sliding arm coupled to the earcup assembly for dynamically adjusting the position of the earcup assembly. A latch of the power source assembly snaps into position to secure it with the assembly and slides between latched and unlatched positions to secure a battery.

26 Claims, 12 Drawing Sheets

U.S. PATENT DOCUMENTS

| | | | |
|---|---|---|---|
| 3,192,326 A | 6/1965 | Chapman | |
| D206,665 S | 1/1967 | Sanzone | |
| 3,327,807 A | 6/1967 | Mullin | |
| D212,863 S | 12/1968 | Roberts | |
| 3,568,271 A | 3/1971 | Husserl | |
| 3,654,406 A | 4/1972 | Reinthaler | |
| 3,682,268 A | 8/1972 | Gorike | |
| 3,969,796 A | 7/1976 | Hodsdon et al. | |
| 3,971,900 A | 7/1976 | Foley | |
| 3,971,901 A * | 7/1976 | Foley | 379/430 |
| 3,984,885 A | 10/1976 | Yoshimura et al. | |
| 4,018,599 A | 4/1977 | Hill et al. | |
| 4,020,297 A | 4/1977 | Brodie | |
| 4,024,368 A | 5/1977 | Shattuck | |
| 4,031,295 A | 6/1977 | Rigazio | |
| 4,039,765 A | 8/1977 | Tichy et al. | |
| 4,138,598 A | 2/1979 | Cech | |
| 4,189,788 A | 2/1980 | Schenke et al. | |
| 4,239,936 A | 12/1980 | Sakoe | |
| RE30,662 E | 6/1981 | Foley | |
| 4,302,635 A | 11/1981 | Jacobsen et al. | |
| D265,989 S | 8/1982 | Harris et al. | |
| 4,357,488 A | 11/1982 | Knighton et al. | |
| D268,675 S | 4/1983 | Hass | |
| 4,418,248 A | 11/1983 | Mathis | |
| 4,471,496 A | 9/1984 | Gardner, Jr. et al. | |
| 4,472,607 A | 9/1984 | Houng | |
| 4,499,593 A | 2/1985 | Antle | |
| D278,805 S | 5/1985 | Bulgari | |
| 4,625,083 A | 11/1986 | Poikela | |
| 4,634,816 A | 1/1987 | O'Malley | |
| 4,672,672 A | 6/1987 | Eggert et al. | |
| 4,672,674 A | 6/1987 | Clough et al. | |
| 4,689,822 A | 8/1987 | Houng | |
| D299,129 S | 12/1988 | Wiegel | |
| 4,821,318 A | 4/1989 | Wu | |
| D301,145 S | 5/1989 | Besasie et al. | |
| 4,845,650 A | 7/1989 | Meade et al. | |
| 4,875,233 A | 10/1989 | Derhaag et al. | |
| 4,907,266 A | 3/1990 | Chen | |
| 4,952,024 A | 8/1990 | Gale | |
| D313,092 S | 12/1990 | Nilsson | |
| 5,003,589 A | 3/1991 | Chen | |
| 5,018,599 A | 5/1991 | Dohi | |
| 5,023,824 A | 6/1991 | Chadima, Jr. et al. | |
| D318,670 S | 7/1991 | Taniguchi | |
| 5,028,083 A | 7/1991 | Mischenko | |
| 5,056,161 A | 10/1991 | Breen | |
| D321,879 S | 11/1991 | Emmerling | |
| 5,113,428 A | 5/1992 | Fitzgerald | |
| D326,655 S | 6/1992 | Iribe | |
| 5,155,659 A | 10/1992 | Kunert | |
| 5,177,784 A | 1/1993 | Hu et al. | |
| 5,179,736 A | 1/1993 | Scanlon | |
| D334,043 S | 3/1993 | Taniguchi et al. | |
| 5,197,332 A | 3/1993 | Shennib | |
| 5,202,197 A | 4/1993 | Ansell et al. | |
| D337,116 S | 7/1993 | Hattori | |
| 5,225,293 A | 7/1993 | Mitchell et al. | |
| 5,251,105 A | 10/1993 | Kobayashi et al. | |
| D341,567 S | 11/1993 | Acker et al. | |
| 5,267,181 A | 11/1993 | George | |
| 5,281,957 A | 1/1994 | Schoolman | |
| D344,494 S | 2/1994 | Cardenas | |
| D344,522 S | 2/1994 | Taniguchi | |
| 5,305,244 A | 4/1994 | Newman et al. | |
| 5,369,857 A | 12/1994 | Sacherman et al. | |
| 5,371,679 A | 12/1994 | Abe et al. | |
| 5,381,473 A | 1/1995 | Andrea et al. | |
| 5,381,486 A | 1/1995 | Ludeke | |
| 5,406,037 A | 4/1995 | Nageno et al. | |
| 5,438,626 A | 8/1995 | Neuman et al. | |
| 5,438,698 A | 8/1995 | Burton et al. | |
| 5,446,788 A | 8/1995 | Lucey et al. | |
| 5,469,505 A | 11/1995 | Gattey et al. | |
| D365,559 S | 12/1995 | Fathi | |
| 5,475,791 A | 12/1995 | Schalk | |
| 5,479,001 A | 12/1995 | Kumar | |
| D367,256 S | 2/1996 | Tokunaga | |
| 5,491,651 A | 2/1996 | Janik | |
| 5,501,571 A | 3/1996 | Van Durrett et al. | |
| 5,515,303 A | 5/1996 | Cargin, Jr. et al. | |
| 5,535,437 A | 7/1996 | Karl et al. | |
| 5,553,312 A | 9/1996 | Gattey et al. | |
| 5,555,490 A | 9/1996 | Carroll | |
| 5,555,554 A | 9/1996 | Hofer | |
| 5,563,952 A | 10/1996 | Mercer | |
| 5,572,401 A | 11/1996 | Carroll | |
| 5,572,623 A | 11/1996 | Pastor | |
| 5,579,400 A | 11/1996 | Ballein | |
| D376,598 S | 12/1996 | Hayashi | |
| D377,020 S | 12/1996 | Bungardt et al. | |
| 5,581,492 A | 12/1996 | Janik | |
| 5,604,050 A | 2/1997 | Brunette et al. | |
| 5,604,813 A * | 2/1997 | Evans et al. | 381/71.6 |
| 5,607,792 A | 3/1997 | Garcia et al. | |
| D380,199 S | 6/1997 | Beruscha et al. | |
| 5,637,417 A | 6/1997 | Engmark et al. | |
| D384,072 S | 9/1997 | Ng | |
| 5,665,485 A | 9/1997 | Kuwayama et al. | |
| 5,671,037 A | 9/1997 | Ogasawara et al. | |
| 5,673,325 A | 9/1997 | Andrea et al. | |
| 5,673,364 A | 9/1997 | Bialik | |
| D385,272 S | 10/1997 | Jensen | |
| 5,680,465 A | 10/1997 | Boyden | |
| D385,855 S | 11/1997 | Ronzani | |
| D387,898 S | 12/1997 | Ronzani | |
| D390,552 S | 2/1998 | Ronzani | |
| D391,234 S | 2/1998 | Chacon et al. | |
| 5,716,730 A | 2/1998 | Deguchi | |
| 5,719,743 A | 2/1998 | Jenkins et al. | |
| 5,719,744 A | 2/1998 | Jenkins et al. | |
| D394,436 S | 5/1998 | Hall et al. | |
| 5,749,072 A | 5/1998 | Mazurkiewicz et al. | |
| 5,757,339 A | 5/1998 | Williams et al. | |
| 5,762,512 A | 6/1998 | Trant et al. | |
| 5,766,794 A | 6/1998 | Brunette et al. | |
| 5,774,096 A | 6/1998 | Usuki et al. | |
| 5,774,837 A | 6/1998 | Yeldener et al. | |
| 5,778,026 A | 7/1998 | Zak | |
| 5,781,644 A | 7/1998 | Chang | |
| 5,787,166 A | 7/1998 | Ullman | |
| 5,787,361 A | 7/1998 | Chen | |
| 5,787,387 A | 7/1998 | Aguilar | |
| 5,787,390 A | 7/1998 | Quinquis et al. | |
| 5,793,865 A | 8/1998 | Leifer | |
| 5,793,878 A | 8/1998 | Chang | |
| D398,899 S | 9/1998 | Chaco | |
| D400,848 S | 11/1998 | Clark et al. | |
| 5,832,098 A | 11/1998 | Chen | |
| 5,841,630 A | 11/1998 | Seto et al. | |
| 5,841,859 A | 11/1998 | Chen | |
| D402,651 S | 12/1998 | Depay et al. | |
| 5,844,824 A | 12/1998 | Newman et al. | |
| 5,856,038 A | 1/1999 | Mason | |
| 5,857,148 A | 1/1999 | Weisshappel et al. | |
| 5,862,241 A | 1/1999 | Nelson | |
| D406,098 S | 2/1999 | Walter et al. | |
| 5,869,204 A | 2/1999 | Kottke et al. | |
| 5,873,070 A | 2/1999 | Bunte et al. | |
| 5,890,074 A | 3/1999 | Rydbeck | |
| 5,890,108 A | 3/1999 | Yeldener | |
| 5,895,729 A | 4/1999 | Phelps, III et al. | |
| D409,137 S | 5/1999 | Sumita et al. | |

| Patent No. | Date | Name |
|---|---|---|
| 5,905,632 A | 5/1999 | Seto et al. |
| D410,466 S | 6/1999 | Mouri |
| D410,921 S | 6/1999 | Luchs et al. |
| D411,179 S | 6/1999 | Toyosato |
| 5,931,513 A | 8/1999 | Conti |
| 5,933,330 A | 8/1999 | Beutler et al. |
| 5,935,729 A | 8/1999 | Mareno et al. |
| D413,582 S | 9/1999 | Tompkins |
| D414,470 S | 9/1999 | Chacon et al. |
| 5,991,085 A | 11/1999 | Rallison et al. |
| 5,999,085 A | 12/1999 | Szwarc et al. |
| 6,014,619 A | 1/2000 | Wuppermann et al. |
| 6,016,347 A | 1/2000 | Magnasco et al. |
| 6,021,207 A | 2/2000 | Puthuff et al. |
| D422,962 S | 4/2000 | Shevlin et al. |
| 6,051,334 A | 4/2000 | Tsurumaru et al. |
| D424,035 S | 5/2000 | Steiner et al. |
| 6,060,193 A | 5/2000 | Remes et al. |
| 6,061,647 A | 5/2000 | Barrett |
| 6,071,640 A | 6/2000 | Robertson, Jr. et al. |
| 6,075,857 A | 6/2000 | Doss, Jr. |
| 6,078,825 A | 6/2000 | Hahn et al. |
| 6,084,556 A | 7/2000 | Zwern |
| 6,085,428 A | 7/2000 | Casby et al. |
| 6,091,546 A | 7/2000 | Spitzer |
| D430,158 S | 8/2000 | Bhatia et al. |
| D430,159 S | 8/2000 | Bhatia et al. |
| 6,101,260 A | 8/2000 | Jensen et al. |
| 6,114,625 A | 9/2000 | Hughes et al. |
| 6,120,932 A | 9/2000 | Slipy et al. |
| D431,562 S | 10/2000 | Bhatia et al. |
| 6,127,990 A | 10/2000 | Zwern |
| 6,136,467 A | 10/2000 | Phelps, III et al. |
| 6,137,868 A | 10/2000 | Leach |
| 6,137,879 A | 10/2000 | Papadopoulos et al. |
| 6,154,669 A | 11/2000 | Hunter |
| D434,762 S | 12/2000 | Ikenaga |
| 6,157,533 A | 12/2000 | Sallam et al. |
| 6,160,702 A | 12/2000 | Lee et al. |
| 6,167,413 A | 12/2000 | Daley, III |
| D436,104 S | 1/2001 | Bhatia et al. |
| 6,171,138 B1 | 1/2001 | Lefebvre et al. |
| 6,179,192 B1 | 1/2001 | Weinger et al. |
| 6,188,985 B1 | 2/2001 | Thrift et al. |
| 6,190,795 B1 | 2/2001 | Daley |
| D440,966 S | 4/2001 | Ronzani |
| 6,225,777 B1 | 5/2001 | Garcia et al. |
| 6,226,622 B1 | 5/2001 | Dabbiere |
| 6,229,694 B1 | 5/2001 | Kono |
| 6,230,029 B1 | 5/2001 | Hahn et al. |
| 6,235,420 B1 | 5/2001 | Ng |
| 6,237,051 B1 | 5/2001 | Collins |
| D443,870 S | 6/2001 | Carpenter et al. |
| 6,252,970 B1 | 6/2001 | Poon et al. |
| 6,261,715 B1 | 7/2001 | Nakamura et al. |
| D449,289 S | 10/2001 | Weikel et al. |
| 6,302,454 B1 | 10/2001 | Tsurumaru et al. |
| 6,304,430 B1 | 10/2001 | Laine et al. |
| 6,304,459 B1 | 10/2001 | Toyosato et al. |
| 6,310,888 B1 | 10/2001 | Hamlin |
| 6,324,053 B1 | 11/2001 | Kamijo |
| D451,903 S | 12/2001 | Amae et al. |
| D451,907 S | 12/2001 | Amae et al. |
| 6,325,507 B1 | 12/2001 | Jannard et al. |
| 6,326,543 B1 | 12/2001 | Lamp et al. |
| 6,327,152 B1 | 12/2001 | Saye |
| 6,339,706 B1 | 1/2002 | Tillgren et al. |
| 6,339,764 B1 | 1/2002 | Livesay et al. |
| 6,349,001 B1 | 2/2002 | Spitzer |
| 6,353,313 B1 | 3/2002 | Estep et al. |
| 6,356,635 B1 | 3/2002 | Lyman et al. |
| 6,357,534 B1 | 3/2002 | Buetow et al. |
| 6,359,603 B1 | 3/2002 | Zwern |
| 6,359,777 B1 | 3/2002 | Newman et al. |
| 6,359,995 B1 | 3/2002 | Ou |
| 6,369,952 B1 | 4/2002 | Rallison et al. |
| 6,371,535 B2 | 4/2002 | Wei et al. |
| 6,373,693 B1 | 4/2002 | Seto et al. |
| 6,373,942 B1 | 4/2002 | Braund |
| 6,374,126 B1 | 4/2002 | MacDonald, Jr. et al. |
| 6,376,942 B1 | 4/2002 | Burger et al. |
| 6,377,825 B1 | 4/2002 | Kennedy et al. |
| D457,133 S | 5/2002 | Yoneyama |
| 6,384,591 B1 | 5/2002 | Estep et al. |
| 6,384,982 B1 | 5/2002 | Spitzer |
| 6,386,107 B1 | 5/2002 | Rancourt |
| 6,394,278 B1 | 5/2002 | Reed |
| 6,434,251 B1 | 8/2002 | Jensen et al. |
| 6,445,175 B1 | 9/2002 | Estep et al. |
| 6,446,042 B1 | 9/2002 | Detlef et al. |
| 6,453,020 B1 | 9/2002 | Hughes et al. |
| D463,784 S | 10/2002 | Taylor et al. |
| 6,466,681 B1 * | 10/2002 | Siska et al. ............... 381/372 |
| D465,208 S | 11/2002 | Lee et al. |
| D465,209 S | 11/2002 | Rath |
| D466,497 S | 12/2002 | Wikel et al. |
| 6,496,111 B1 | 12/2002 | Hosack |
| D469,080 S | 1/2003 | Kohli |
| 6,511,770 B2 | 1/2003 | Chang |
| 6,562,950 B2 | 5/2003 | Peretz et al. |
| 6,581,782 B2 | 6/2003 | Reed |
| 6,600,798 B2 | 7/2003 | Wuppermann et al. |
| 6,615,174 B1 | 9/2003 | Arslan et al. |
| D482,019 S | 11/2003 | Petersen et al. |
| 6,660,427 B1 | 12/2003 | Hukill et al. |
| D487,064 S | 2/2004 | Stekelenburg |
| 6,697,465 B1 | 2/2004 | Goss |
| D488,146 S | 4/2004 | Minto |
| D488,461 S | 4/2004 | Okada et al. |
| 6,728,325 B1 | 4/2004 | Hwang et al. |
| D491,917 S | 6/2004 | Asai |
| D492,295 S | 6/2004 | Glatt |
| 6,745,014 B1 | 6/2004 | Seibert et al. |
| 6,754,361 B1 | 6/2004 | Hall et al. |
| 6,754,632 B1 | 6/2004 | Kalinowski et al. |
| 6,757,651 B2 | 6/2004 | Vergin |
| D494,517 S | 8/2004 | Platto et al. |
| 6,769,762 B2 | 8/2004 | Saito et al. |
| 6,769,767 B2 | 8/2004 | Swab et al. |
| 6,772,114 B1 | 8/2004 | Sluijter et al. |
| 6,778,676 B2 | 8/2004 | Groth et al. |
| 6,795,805 B1 | 9/2004 | Bessette et al. |
| D498,231 S | 11/2004 | Jacobson et al. |
| 6,826,532 B1 | 11/2004 | Casby et al. |
| 6,847,336 B1 | 1/2005 | Lemelson et al. |
| 6,885,735 B2 | 4/2005 | Odinak et al. |
| D506,065 S | 6/2005 | Sugino et al. |
| 6,909,546 B2 | 6/2005 | Hirai |
| D507,523 S | 7/2005 | Resch et al. |
| D512,417 S | 12/2005 | Hirakawa et al. |
| D512,984 S | 12/2005 | Ham |
| D512,985 S | 12/2005 | Travers et al. |
| 7,013,018 B2 | 3/2006 | Bogeskov-Jensen |
| D519,497 S | 4/2006 | Komiyama |
| 7,027,774 B2 | 4/2006 | Kuon |
| D521,492 S | 5/2006 | Ham |
| 7,046,649 B2 | 5/2006 | Awater et al. |
| 7,050,598 B1 | 5/2006 | Ham |
| 7,052,799 B2 | 5/2006 | Zatezalo |
| D524,794 S | 7/2006 | Kim |
| D525,237 S | 7/2006 | Viduya |
| 7,106,877 B1 | 9/2006 | Linville |
| 7,107,057 B2 | 9/2006 | Arazi et al. |
| 7,110,800 B2 | 9/2006 | Nagayasu et al. |
| D529,447 S | 10/2006 | Greenfield |
| D531,586 S | 11/2006 | Poulet |

| | | |
|---|---|---|
| 7,136,684 B2 | 11/2006 | Matsuura et al. |
| D537,438 S | 2/2007 | Hermansen |
| 7,203,651 B2 | 4/2007 | Baruch et al. |
| D549,694 S | 8/2007 | Viduya et al. |
| D567,218 S | 4/2008 | Viduya et al. |
| D567,219 S | 4/2008 | Viduya et al. |
| D567,799 S | 4/2008 | Viduya et al. |
| D567,806 S | 4/2008 | Viduya et al. |
| 7,391,863 B2 | 6/2008 | Viduya |
| 7,519,186 B2 | 4/2009 | Varma et al. |
| 7,596,489 B2 | 9/2009 | Kovesi et al. |
| 2001/0004310 A1 | 6/2001 | Kono |
| 2001/0017925 A1 | 8/2001 | Ceravolo |
| 2001/0017926 A1 | 8/2001 | Vicamini |
| 2001/0036058 A1 | 11/2001 | Jenks et al. |
| 2001/0036291 A1 | 11/2001 | Pallai |
| 2001/0046305 A1 | 11/2001 | Muranami et al. |
| 2001/0048586 A1 | 12/2001 | Itou et al. |
| 2002/0000470 A1 | 1/2002 | Lanzaro et al. |
| 2002/0003889 A1 | 1/2002 | Fischer |
| 2002/0009191 A1 | 1/2002 | Lucey et al. |
| 2002/0012832 A1 | 1/2002 | White et al. |
| 2002/0015008 A1 | 2/2002 | Kishida et al. |
| 2002/0016161 A1 | 2/2002 | Dellien et al. |
| 2002/0025455 A1 | 2/2002 | Yoneyama |
| 2002/0034683 A1 | 3/2002 | Takeshita et al. |
| 2002/0067825 A1 | 6/2002 | Baranowski et al. |
| 2002/0068610 A1 | 6/2002 | Anvekar et al. |
| 2002/0076060 A1 | 6/2002 | Hall et al. |
| 2002/0080987 A1 | 6/2002 | Almqvist |
| 2002/0085733 A1 | 7/2002 | Cottrell |
| 2002/0091518 A1 | 7/2002 | Baruch et al. |
| 2002/0091526 A1 | 7/2002 | Kiessling et al. |
| 2002/0110246 A1 | 8/2002 | Gosior et al. |
| 2002/0111197 A1 * | 8/2002 | Fitzgerald .................. 455/568 |
| 2002/0131616 A1 | 9/2002 | Bronnikov et al. |
| 2002/0147016 A1 | 10/2002 | Arazi et al. |
| 2002/0147579 A1 | 10/2002 | Kushner |
| 2002/0152065 A1 | 10/2002 | Kopp |
| 2002/0159574 A1 | 10/2002 | Stogel |
| 2002/0194004 A1 | 12/2002 | Glinski et al. |
| 2002/0194005 A1 | 12/2002 | Lahr |
| 2003/0050786 A1 | 3/2003 | Jax et al. |
| 2003/0068061 A1 | 4/2003 | Huang |
| 2003/0095525 A1 | 5/2003 | Lavin et al. |
| 2003/0103413 A1 | 6/2003 | Jacobi, Jr. et al. |
| 2003/0118197 A1 * | 6/2003 | Nagayasu et al. ............. 381/74 |
| 2003/0130852 A1 | 7/2003 | Tanaka et al. |
| 2003/0171921 A1 | 9/2003 | Manabe et al. |
| 2003/0182243 A1 | 9/2003 | Gerson et al. |
| 2003/0212480 A1 | 11/2003 | Lutter et al. |
| 2003/0217367 A1 | 11/2003 | Romano |
| 2004/0001588 A1 | 1/2004 | Hairston |
| 2004/0010407 A1 | 1/2004 | Kovesi et al. |
| 2004/0024586 A1 | 2/2004 | Andersen |
| 2004/0029610 A1 | 2/2004 | Ihira et al. |
| 2004/0046637 A1 | 3/2004 | Wesby Van Swaay |
| 2004/0049388 A1 | 3/2004 | Roth et al. |
| 2004/0063475 A1 | 4/2004 | Weng |
| 2004/0083095 A1 | 4/2004 | Ashley et al. |
| 2004/0091129 A1 | 5/2004 | Jensen et al. |
| 2004/0137969 A1 | 7/2004 | Nassimi |
| 2004/0138781 A1 | 7/2004 | Sacks et al. |
| 2004/0193411 A1 | 9/2004 | Hui et al. |
| 2004/0203521 A1 | 10/2004 | Nassimi |
| 2005/0040230 A1 | 2/2005 | Swartz et al. |
| 2005/0070337 A1 | 3/2005 | Byford et al. |
| 2005/0149414 A1 * | 7/2005 | Schrodt et al. ................ 705/29 |
| 2005/0157903 A1 | 7/2005 | Bech |
| 2005/0232436 A1 | 10/2005 | Nagayasu et al. |
| 2005/0272401 A1 | 12/2005 | Zatezalo |
| 2007/0223766 A1 | 9/2007 | Davis |

FOREIGN PATENT DOCUMENTS

| | | |
|---|---|---|
| DE | 3604292 | 8/1987 |
| EP | 0380290 | 8/1990 |
| EP | 1018854 | 7/2000 |

OTHER PUBLICATIONS

Vocollect Speech Recognition Headsets brochure—Clarity and comfort. Reliable performance. Copyright Sep. 2005.

Vocollect Speech Recognition Headsets brochure—SR 30 Series Talkman High-Noise Headset. Copyright 2005.

Vocollect SR 20 Talkman Lightweight Headset Product Information Sheet. Copyright Aug. 2004.

Photographs 1-7 SR 20 Talkman Headset—prior art. Copyright Aug. 2004.

Photographs 1-8 SR 30 Talkman Headset—prior art. Copyright Jan. 2005.

U.S. Appl. No. 29/253,487; Inventor: Andres Viduya; entitled Convertible Headset; filed Feb. 7, 2006.

U.S. Appl. No. 29/253,449; Inventor: Andres Viduya; entitled Convertible Headset; filed Feb. 7, 2006.

U.S. Appl. No. 29/242,827; Inventor: James Wahl; entitled Battery for a Headset; field Nov. 15, 2005.

U.S. Appl. No. 29/242,950; Inventor: Andres Viduya; entitled Control Panel for a Headset; filed Nov. 16, 2005.

Lawrence Rabiner and Biing-Hwang Juang, Fundamentals of Speech Recognition, Prentice Hall PTR, United States edition (Apr. 22, 1993), ISBN: 0130151572, pp. 95-117.

Two-page Supplemental Vocollect SR 20, Talkman Lightweight Headset Product Information Sheet. Copyright Aug. 2004.

Hong Kook Kim, et al.; A Bitstream-Based Front-End for Wireless Speech Recognition on IS-136 Communications Systems; IEEE Transactions on Speech and Audio Processing; Manuscript received Feb. 16, 200, revised Jan. 25, 2001; 11 Pages; vol. 9; No. 5; Jul. 2001; New York, NY, US.

Mladen Russo, et al.; Speech Recognition over Bluetooth ACL and SCO Links; A Comparison; Consumer Communications and Networking Conference 2005; Jan. 3-6, 2005; 5 Pages, Las Vegas, NV, US.

* cited by examiner

HEADSET TERMINAL WITH SPEECH FUNCTIONALITY

FIELD OF THE INVENTION

This invention relates generally to portable or mobile computer terminals and more specifically to mobile terminals having speech functionality for executing and directing tasks using voice or speech.

BACKGROUND OF THE INVENTION

Wearable, mobile and/or portable computer terminals are used for a wide variety of tasks. Such terminals allow the workers using them ("users") to maintain mobility, while providing the worker with desirable computing and data-processing functions. Furthermore, such terminals often provide a communication link to a larger, more centralized computer system that directs the activities of the user and processes any collected data. One example of a specific use for a wearable/mobile/portable terminal is a product management system that involves product distribution and tracking as well as product inventory management.

Computerized product management systems with mobile terminals are used in various inventory/order-based industries, such as food and retail product distribution, manufacturing, and quality control, for example. An overall integrated product management system may utilize a central computer system that runs a program for product tracking and management and for order filling. A plurality of mobile terminals is employed by the users of the system to communicate (usually in a wireless fashion) with the central system for the product handling. The users perform various manual tasks, such as product picking and placement, per instructions they receive through the terminals, via the central system. The terminals also allow the users to interface with the computer system, such as to respond to inquiries or confirm the completion of certain tasks. Therefore, an overall integrated management system involves a combination of a central computer system for tracking and management, and the people who use and interface with the computer system in the form of order fillers, pickers and other workers. The workers handle the manual aspects of the integrated system under the command and control of information transmitted from the central computer system to the wireless mobile terminals worn by the users.

To provide an interface between the central computer system and the workers, such mobile terminals and the central systems to which they are connected may be voice-driven or speech-driven; i.e., the system operates using human speech. Speech is synthesized and played to the user, via the mobile terminal, to direct the tasks of the user and collect data. The user then answers or asks questions; and the speech recognition capabilities of the mobile terminal convert the user speech to a form suitable for use by the terminal and central system. Thereby, a bidirectional communication stream of information is exchanged over a wireless network between the wireless wearable terminals and the central computer system using speech.

Conventionally, mobile computer terminals having voice or speech capabilities utilize a headset device that is coupled to the mobile terminal. The terminal is worn on the body of a user, such as around the waist, and the headset connects to the terminal, such as with a cord or cable. The headset has a microphone for capturing the voice of the user for voice data entry and commands, and also includes one or more ear speakers for both confirming the spoken words of the user and also for playing voice instructions and other audio that are generated or synthesized by the terminal. Through the headset, the workers are able to receive voice instructions or questions about their tasks, ask and answer questions, report the progress of their tasks, and report working conditions, such as inventory shortages, for example. Therefore, in conventional mobile terminal systems, headsets are matched with respective terminals and worn by the user to operate in conjunction with the terminals.

An illustrative example of a set of worker tasks suitable for a wireless mobile terminal with speech capabilities may involve initially welcoming the worker to the computerized inventory management system and defining a particular task or order, for example, filling a load for a particular truck scheduled to depart from a warehouse. The worker may then answer with a particular area (e.g., freezer) that they will be working in for that order. The system then vocally directs the worker to a particular aisle and bin to pick a particular quantity of an item for the order. The worker then vocally confirms the location that they have gone to and vocally confirms the number of picked items, and/or various other information about the picked items. The system then directs the worker to the next items to be picked for the order, and this continues until the order is filled or otherwise completed. The system may then direct the worker to a loading dock or bay for a particular truck to receive the finished order. As may be appreciated, the specific communications exchanged between the wireless mobile terminal and the central computer system using speech can be task-specific and highly variable.

The mobile speech terminals provide a significant efficiency in the performance of the workers tasks. Specifically, using such terminals, the work is done virtually hands-free without equipment to juggle or paperwork to carry around. However, while existing speech systems provide hands-free operations, they also have various drawbacks associated with their configuration, and particularly with the headset and its interface with the mobile terminal.

One drawback with current systems is that the headset is attached to a terminal with a cord which extends generally from the terminal (typically worn on a belt) to the head of the worker where the headset is located. As may be appreciated, the workers are moving rapidly around their work area and are often jumping on and off forklifts, pallet loaders, and other equipment. Therefore, there is a possibility for a cord to get caught on some object, such as a forklift. When this occurs, the cord will tend to want to separate either from the headset or from the terminal, thus requiring repair or replacement. Generally, the cords are permanently attached to a headset and each worker maintains their own headset (e.g. for individual responsibility and/or hygiene purposes). The cords are then plugged into the terminals; therefore, the separation will generally occur at the terminal socket.

Attempts have been made to appropriately handle a snagged cord and cord separation to prevent such an event from rendering the terminal inoperable and in need of repair and replacement. One suitable approach is illustrated in U.S. Pat. No. 6,910,911, which is commonly owned with the present application. However, the loose and dangling cord still remains somewhat of an issue with voice-enabled mobile terminals and their headsets.

Attempts have been made to eliminate the cords between the headset and mobile terminals by using wireless headsets. For example, such an approach is set forth in U.S. patent application Ser. No. 11/303,271 entitled Wireless Headset and Method for Robust Voice Data Communication, filed Dec. 16, 2005, which application is incorporated herein by reference in its entirety. However, such a system still requires a separate mobile terminal for use with the headset. As may be appreciated, multiple headsets and mobile terminals increases the number of units that must be purchased, maintained and tracked at a facility. In a large warehouse facility, this may be a significant task and also present a significant cost in maintaining the equipment. Therefore, there is still a need to improve upon existing mobile terminal systems and particularly to improve upon such systems that are utilized in speech tasks or speech-enabled environments. One suitable solution is to incorporate the functionality of a speech terminal with a head-worn device. This eliminates the need for separate headsets and addresses the issues noted above. However, other issues have not been adequately addressed and thus there remains a need for a mobile head-worn terminal that is suitable for speech-directed applications.

Any solution to the above-noted issues must address wearability and control issues by providing a headset that is operable on both sides of the head without a significant positional shift in the layout of the terminal and its controls. Furthermore, since the headset terminal is worn for extended periods on the head, it must be comfortable for the user and readily positioned on either side of the head. Weight is also a consideration, as is complexity in the construction of the headset terminal. Because of the increased processing functions that are necessary in a speech-enabled headset terminal, the space usage, the circuit component layout, and necessary wiring must also be addressed in a suitably robust, yet aesthetically pleasing design. Loose or exposed wires or cables in a headset are unappealing and certainly undesirable in a work environment.

Power considerations are also an issue in a headset terminal, as the weight of a battery is no longer carried at the waist of a user. Any battery must be readily removable and replaceable without a complicated mounting assembly that adds complexity and weight to the overall headset design.

Furthermore, because of the increased functionality of a headset terminal, it must have the ability to operate wirelessly with an overall central system or other components.

Still further, in conventional headset/terminal assemblies, the users generally maintain their own headset for hygiene purposes and share the mobile terminals. Incorporating the terminal functionality into a headset eliminates the separate shared terminal, and thus there is a need to address the hygiene aspects of the work environment in a headset terminal, while allowing sharing of the headset terminal among various worker shifts.

Accordingly, there is a need, unmet by current communication systems and mobile terminals, to address the issues noted above. There is particularly an unmet need in the area of terminals for performing speech-directed work and other speech-directed tasks using synthesized speech and speech recognition.

BRIEF DESCRIPTION OF THE DRAWINGS

The accompanying drawings, which are incorporated in and constitute a part of this specification, illustrate embodiments of the invention and, together with a general description of the invention given above and the Detailed Description given below, serve to explain the invention.

DETAILED DESCRIPTION OF EMBODIMENTS OF THE INVENTION

The present invention is directed to a unique headset configuration. One embodiment of the present invention is a speech-enabled mobile computer in the form of a wireless headset for handling speech-directed applications that require high mobility and high data transmission speed, such as warehousing, manufacturing, pharmaceutical, logging, and defense applications. The headset terminal of the present invention provides full speech functionality, is ultra lightweight, i.e., less than 10 ounces, provides full shift operation on a single battery charge, and includes a modular architecture that allows the separation of the "personal" components of the wireless headset mobile computer, i.e., those that touch the user's head, ears, or mouth, from the non-personal expensive electronics and, thereby, promotes good hygiene and low cost of ownership. The embodiment of the present invention provides the full speech functionality of a Vocollect Talkman® or T2® or T5® which is sold by Vocollect of Pittsburgh, Pa., the owner of the present application.

The mobile headset of the invention also incorporates unique features in its controls, headband structure, battery configuration and microphone/speaker assembly, that enhance the operation, comfort, durability, versatility and robustness of the headset. While one particular embodiment of the invention as discussed herein is in the form of a fully speech-enabled mobile headset terminal, the various aspects of the headset design as disclosed herein are equally applicable in a stand-alone headset that operates with a separate, body-worn, mobile computer terminal. That is, the headset features disclosed herein are also equally applicable to a conventional headset that couples by wire or wirelessly to a body-worn terminal. The features of the invention, for example, are applicable to use with the wireless headset and system set forth in U.S. patent application Ser. No. 11/303, 271, noted above. Furthermore, the aspects of the invention have applicability to headsets in general, and not just to those used in conjunction with mobile terminals. Therefore, various aspects of the present invention are not limited only to mobile speech terminals and similar applications, but have applicability to headsets in general, wired or wireless. Of course, the aspects of the invention have particular applicability to wireless headsets and mobile headset terminals.

Figure 1:
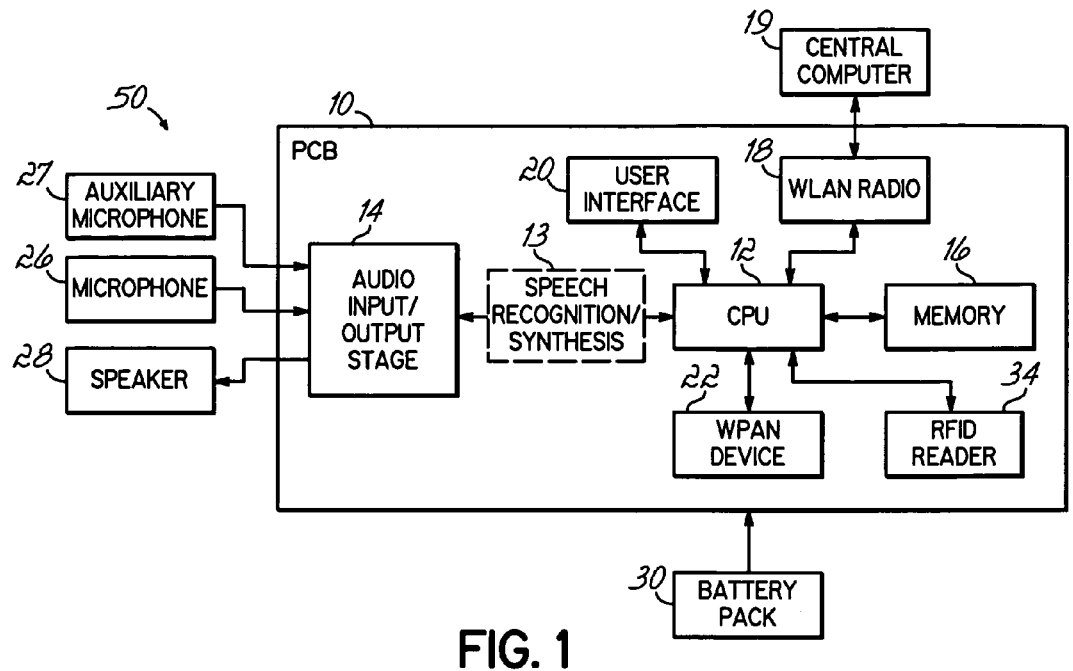
FIG. 1 is schematic block diagram of a system for a mobile terminal embodiment of the present invention.

FIG. 1 illustrates a functional block diagram of a wireless, mobile headset terminal or computer 50 in accordance with an embodiment of the invention. Headset terminal 50 provides speech functionality equal to or exceeding the functionality of the Vocollect "Talkman" or "T2" or "T5" mobile computers, available from Vocollect of Pittsburgh, Pa. To that end, a processor or CPU 12 may include the speech recognition and speech synthesis circuitry as well as applications to direct the activity of a user using speech or voice. In one embodiment, wireless headset terminal 50 is a speech-enabled device that uses speech predominantly for input and output (e.g., no standard I/O devices, such as a video display, keypad, or mouse). Headset terminal provides improvements over existing speech-enabled products, such as packaging simplification, weight reduction, dynamic performance improvements, cost and maintenance reduction, reduced power consumption, reliability improvements, increased radio bandwidth, and elimination of all cables and cords usually associated with headsets.

Figure 2:
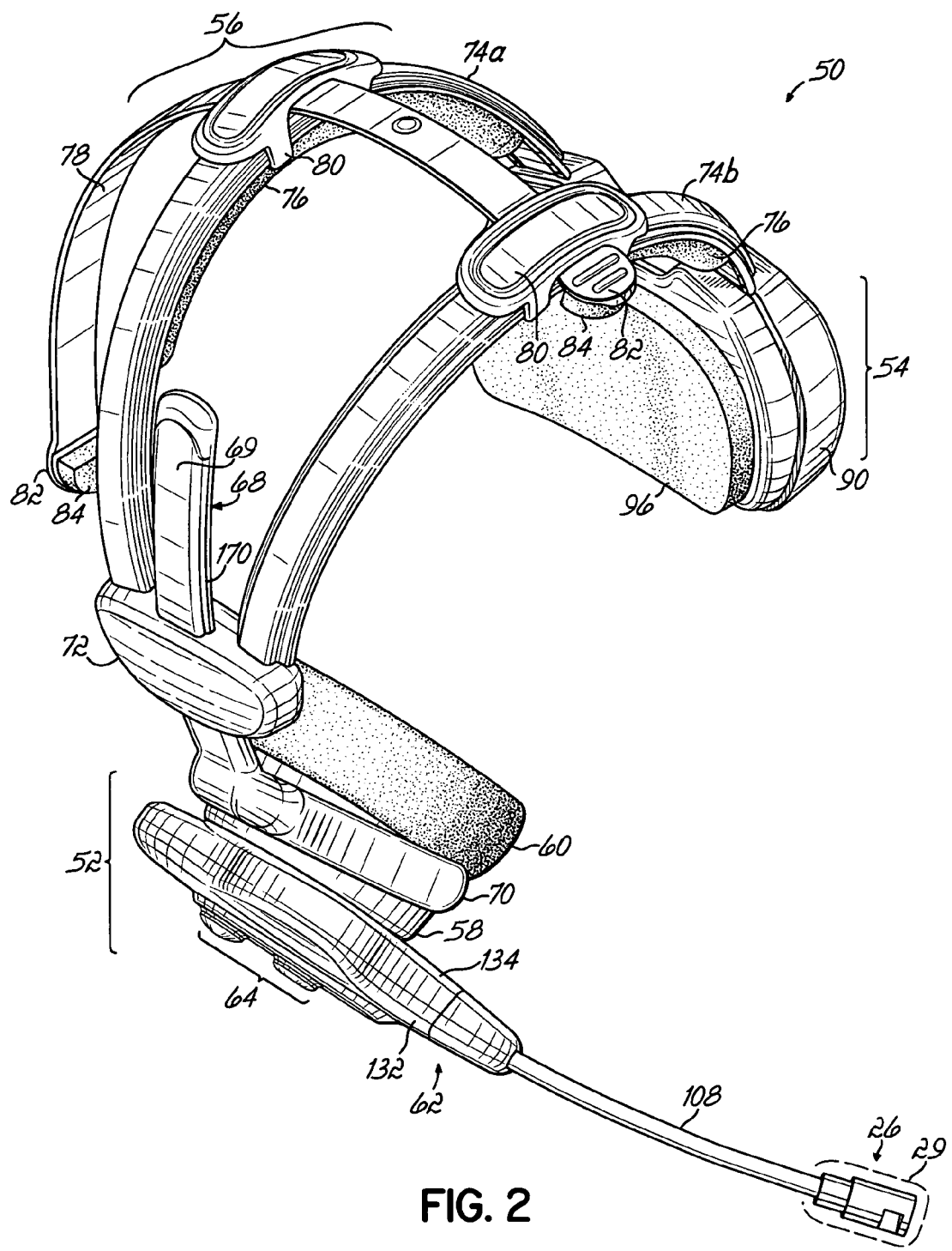
FIG. 2 is a perspective view of a headset terminal in accordance with an embodiment of the present invention.

Headset terminal 50 includes one or more printed circuit boards (PCBs) 10 that contain the electronic components of the headset terminal. For example, the PCB 10 might be located in the earcup assembly 52 of headset terminal 50 as shown in FIGS. 2 and 5, and might contain all of the processing components, including speech processing components, for the terminal. In another embodiment, another PCB might be positioned in the electronics/power source assembly 54 (see FIG. 2), along with the power source, such as a battery. The functional processing and electrical components shown in FIG. 1 may thus be positioned in various places or on multiple PCB's in terminal 50. For the purpose of discussion, they are shown on a single PCB 10. Headset terminal 50 includes a processor or CPU 12, an audio input/output stage 14, memory, such as a flash RAM 16, a WLAN radio 18, a user interface or control 20, and a WPAN device 22. Wireless headset terminal 50 further includes a microphone 26 (it may also include an auxiliary microphone 27), a speaker 28 (FIG. 5), and a battery pack or other power source 30 (FIG. 11). More details of the physical integration of the elements of wireless headset terminal 50 are discussed in reference to FIGS. 2-16 herein. In some embodiments, terminal 50 utilizes an integrated RFID reader 34 or couples to an RFID reader through an appropriate connection. The RFID reader is operable for reading an RFID tag and generating an output reflective of the read tag.

For example, headset terminal may operate with the functionality of the system disclosed in U.S. patent application Ser. No. 11/247,291 entitled Integrated Wearable Terminal for Voice-Directed Work and RFID Identification/Verification, filed Oct. 11, 2005, which application is incorporated by reference herein in its entirety. To that end, the processor 12 may include the necessary speech recognition/synthesis circuitry for voice or speech applications, such as those applications that direct the work of a user. The headset terminal supports various operator languages, with a wide range of text-to-speech functionality. Terminal 50 is also configured with "record and playback" technology. Terminal 50 and processor 12 are configured, as appropriate, to be fully functional with existing Talkman™ software infrastructure components, including Voice Console™, Voice Link™ and Voice Builder™ components available from Vocollect.

Wireless headset terminal 50 is a strong, lightweight computer terminal that is especially designed for use in industrial environments. The terminal may operate in an environment −30° C. to 50° C. The user wears headset terminal 50 on their head and, thus, retains full freedom of movement. There are no exposed wires or cords to get caught or snagged. Through speaker 28, the operator receives information or commands in a speech or voice format and responds directly to the commands by speaking into a microphone 26. All information is relayed, in real time or batch, to and from a central computer (not shown) through a wireless RF network (not shown), as is known in the art of speech-enabled systems.

Processor/CPU 12 is a general purpose processor for managing the overall operation of wireless headset terminal 50. Processor/CPU 12 may be, for example, a 600 MHz Intel® XScale™ processor, or other processor, indicative of currently available technology. The XScale™ processor combines the processor and memory in a small square device. Processor 12 is capable of handling various speech recognition algorithms and speech synthesis algorithms without the need for additional speech recognition technology, such as ASICs or DSP components. Processor 12, in one embodiment, thus includes speech recognition circuitry and speech synthesis circuitry for recognizing and synthesizing speech. Processor 12 also includes suitable software for providing speech applications, such as work applications to communicate activity information with a user by speech and also to collect data from the user about the activity also using speech. Such speech applications as used for worker direction are known and are available from Vocollect, Inc., Pittsburgh, Pa. Processor 12 is suitably electrically connected to the various components of the terminal as shown in FIG. 1, by appropriate interconnections. In another embodiment, the speech recognition/synthesis circuitry might be separate from CPU 12 as shown with reference numeral 13.

The audio input/output stage 14 receives an audio signal from microphone 26, which may be a standard boom-mounted, directional, noise-canceling microphone that is positioned near the user's mouth. Audio input/output stage 14 also provides a standard audio output circuit for driving speaker 28, which may be a standard audio speaker located in the earcup of wireless headset terminal 50 as shown in FIG. 2. Memory 16 may be a standard memory storage device that serves as the program and data memory device associated with Processor 12. Memory component 16 may be in addition to other memory, such as flash memory, in the processor. While each of the functional blocks is shown separately in FIG. 1, the functionality of certain blocks might be combined in a single device.

WLAN radio component 18 is a standard WLAN radio that uses well-known wireless networking technology, such as WiFi, for example, that allows multiple devices to share a single high-speed connection for a WLAN. WLAN refers to any type of wireless local area network, including 802.11b, 802.11a, and 802.11g and a full 801.22i wireless security suite. WLAN radio 18 is integrated into wireless headset terminal 50. Furthermore, WLAN radio 18 provides high bandwidth that is suitable for handling applications that require high data transmission speed, such as warehousing, manufacturing, pharmaceutical, logging, and defense applications. WLAN radio 18 may be used for transmitting data in real time or in batch form to/from the central computer 19 and receiving work applications, tasks or assignments, for example.

User interface 20 provides control of the headset terminal and is coupled with suitable control components 64, such as control buttons as illustrated in FIG. 2. User interface 20 and controls 64 are used for controlling the terminal 50 for anything that cannot be accomplished by voice, such as for turning power ON/OFF, varying volume, moving through selection menus, etc.

WPAN interface device 22 is a component that permits communication in a wireless personal area network (WPAN), such as Bluetooth, for example, which is a wireless network for interconnecting devices centered around a person's workspace, e.g., the headset terminal user's workspace. The WPAN interface device 22 allows terminal 50 to interface with any WPAN-compatible, body-worn wireless peripheral devices associated with the terminal user, such as Bluetooth devices.

Battery pack 30 is a lightweight, rechargeable power source that provides suitable power for running terminal 50 and its components. Battery pack 30, for example, may include one or more lithium-sulfur batteries that have suitable capacity to provide full shift operation of wireless headset terminal 50 on a single charge.

FIG. 2 illustrates a side perspective view of a headset apparatus suitable for the headset terminal of the invention. FIG. 2 shows that wireless headset terminal 50 includes a headband assembly 56 and an earcup assembly 52 with a microphone boom assembly 62. Earcup assembly 52 and microphone boom assembly 62 further include an earcup housing 58, a boom outer housing 132, 134, and a boom arm 108, upon which is mounted microphone 26, which may be covered with a removable microphone windscreen 29, and user controls 64, which are coupled with user interface 20 of FIG. 1. The embodiment illustrated in the Figures shows relatively simple controls, such as control buttons 102, 104. However, the controls may be further sophisticated, as desired.

As noted, FIG. 2 illustrates one embodiment of a headset for incorporating embodiments of the present invention. For example, the headset 50 might be utilized to incorporate the wireless voice-enabled terminal discussed herein, as one aspect of the invention. Alternatively, headset 50 might also be utilized as a stand-alone headset that is coupled by wire or wirelessly to a separate portable or mobile voice terminal that is appropriately worn, such as on the waist of a user that is using headset 50. Headset 50 incorporates various different features and aspects of the present invention that will find applicability not only with a wireless voice-enabled headset terminal as discussed herein, but also with a headset for use with a separate body-worn terminal, or with a headset for other uses, such as non-voice-enabled uses.

Headset 50 includes an earcup structure or assembly 52 connected with an opposing power source/electronics structure or assembly 54. As may be appreciated, the earcup assembly 52 couples with the ear of a user while the power source/electronics assembly 54 sits on the opposite side of a user's head. Both structures 52, 54 are coupled together by a headband assembly 56 as discussed further hereinbelow. Headset 50 incorporates various features of the invention. In one embodiment of the invention, the headset 50 itself is a fully-operable, voice-enabled mobile computer terminal that includes the necessary electronics, as discussed above, to provide speech recognition and speech synthesis for various speech-directed applications. To that end, the electronics, which would be incorporated on a suitable printed circuit board 10, may be located in either the earcup assembly 52 and/or the power supply/electronics assembly 54. The earcup assembly 52 is adjustable as discussed further hereinbelow and shown in FIGS. 6-8, and thus may be adjusted to fit comfortably onto a user's head.

The earcup assembly 52 includes a housing 58 which houses the various components of the earcup assembly, such as a speaker 28, and supports the boom assembly 62 that may include electronics 10, including any electronics which might be utilized to make the headset a mobile terminal for voice applications as shown in FIG. 1. A cushion or earpad 60 is formed of foam or another suitable material for comfort on the ear when the headset is worn and the earpad abuts the user's ear. The earpad 60 interfaces with housing 58 and may be removably coupled with housing 58, such as with a detachable earpad mount, not shown. In that way, the earpad may be easily or readily detached or snapped off of the housing for hygiene purposes as noted herein. A boom assembly 62 is rotatably mounted with the housing 58 and includes suitable controls 64 and a microphone 26, positioned at the end of the boom. A sliding arm 68 couples with housing 58 through a yoke portion or yoke 70. The housing 58 is pivotally mounted with yoke 70, so that the earcup assembly 52 may pivot slightly with respect to the headband assembly 56 for the comfort of the user. The sliding arm 68 slides within a saddle 72 coupled to bands 72a, 72b, in accordance with one aspect of the present invention.

The headband assembly 56 includes two transverse bands 74a, 74b which extend from side-to-side across a user's head to hold the earcup assembly 52 and power source/electronics assembly 54 on the user's head, in a somewhat typical headband fashion. The multiple transverse bands assure a secure fit on the user's head and may include cushions or pads 76, also made of foam or another suitable material for comfort and fit. A stabilizing strap 78 intersects the two transverse bands 74a, 74b and is coupled to each transverse band respectively with a clip 80 or other suitable fixation structure. The stabilizing strap 78 is free to slide through the clips for positioning between the transverse bands. The stabilizing strap 78 also extends partially along the back of the user's head and/or the forehead, as desired by the user, to provide additional stability to headset terminal 50. The strap may slide back and forth so that the headset terminal 50 may be worn on either side of the head. At the end of the stabilizing strap 78 are stop structures 82 and respective cushions 84. The stop structures limit the sliding of the stabilizing strap 78 through the clips 80, so the stabilizing strap cannot be slid past the endmost position. The cushions 84 provide suitable comfort for the user.

Stabilizing strap 78 provides a significant advantage in combination with the multiple transverse bands 74a, 74b. As may be appreciated, the headset terminal 50 may carry significant weight when utilized as a mobile, voice-enabled terminal with suitable processing electronics and a power source, such as a battery. The battery in particular, located in power source/electronics assembly 54 is oftentimes significantly heavy so as to cause a stability issue. The present invention, which utilizes multiple transverse bands 74a, 74b coupled with a stabilizing strap 78, provides the desired stability and comfort for the user. Furthermore, headset terminal 50, is utilized in environments wherein the user is moving very rapidly through multiple tasks and is bending over and standing up quite often. Therefore, the increased stability of the headset provided by one aspect of the present invention is certainly a desirable feature. The power source/electronics assembly 54, as illustrated in FIGS. 2 and 11, includes a housing 90 which may contain other suitable electronics and associate PCB's for headset terminal 50, and which also contains a portable power source, such as battery 92. A latch 94, in accordance with another aspect of the invention discussed further hereinbelow, holds the battery 92 in position. Housing 90 is suitably coupled to ends of respective transverse bands 74a, 74b. A suitable cushion or pad 96 provides user comfort as the power source/electronics assembly 54 rests against the user's head. Generally, the assembly 54 will rest above the ear of the user, while the earcup covers the opposite ear. Other aspects of the headband assembly are illustrated in U.S. Design patent application Ser. No. 29/242,817, entitled HEADSET and filed Nov. 15, 2005, which application is incorporated herein by reference, in its entirety.

Figure 3:
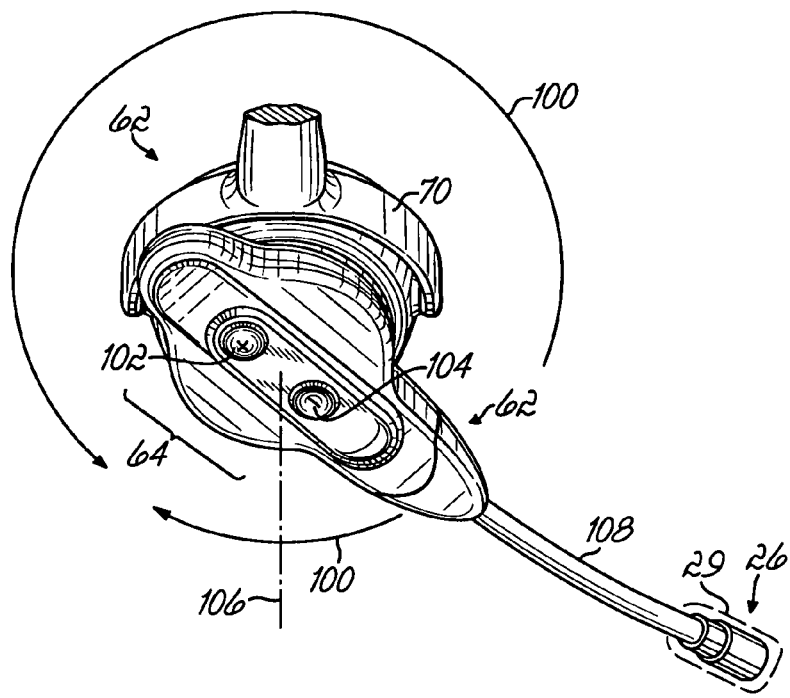
FIG. 3 is a perspective view of a boom assembly for a headset terminal in accordance with an embodiment of the present invention.
Figure 4:
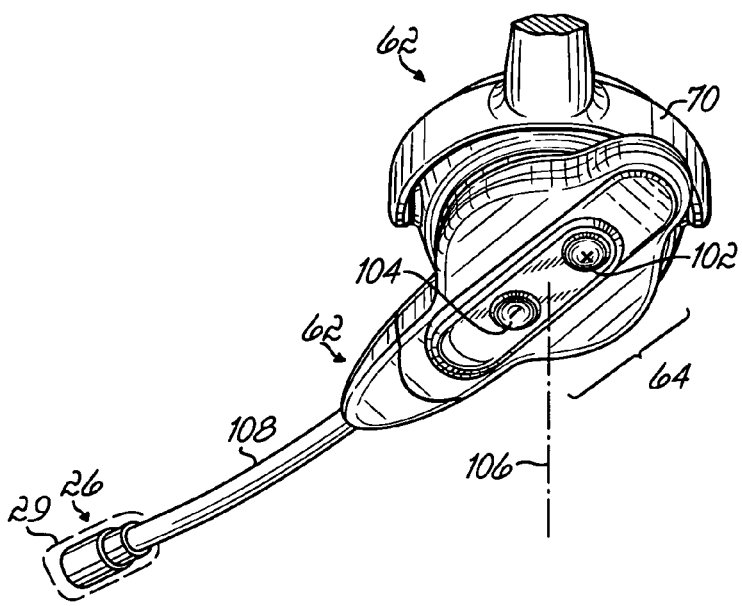
FIG. 4 is another perspective view of a boom assembly for a headset terminal in accordance with an embodiment of the present invention.
Figure 5:
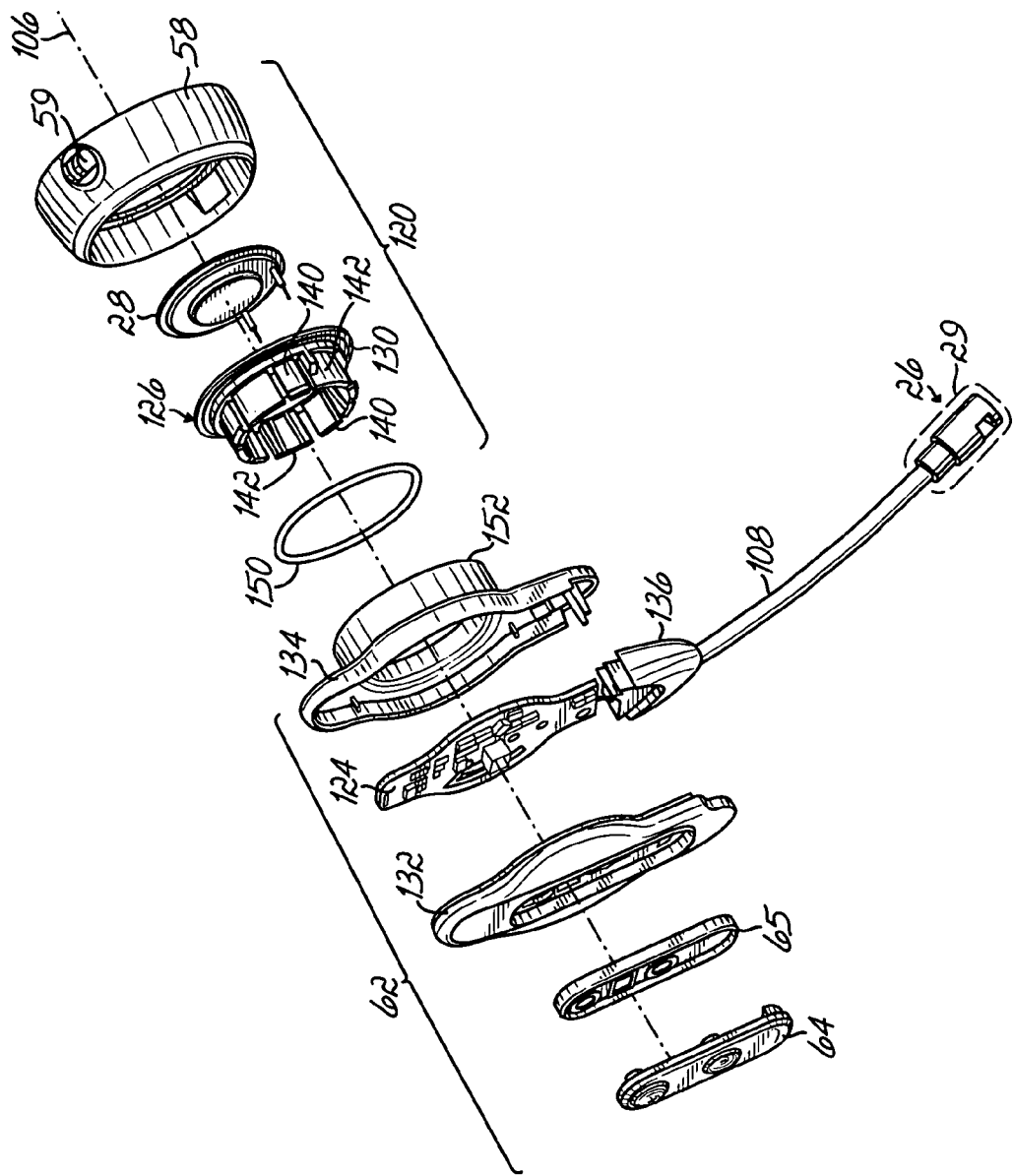
FIG. 5 is an exploded perspective view of a boom assembly for a headset terminal in accordance with an embodiment of the present invention.
Figure 6:
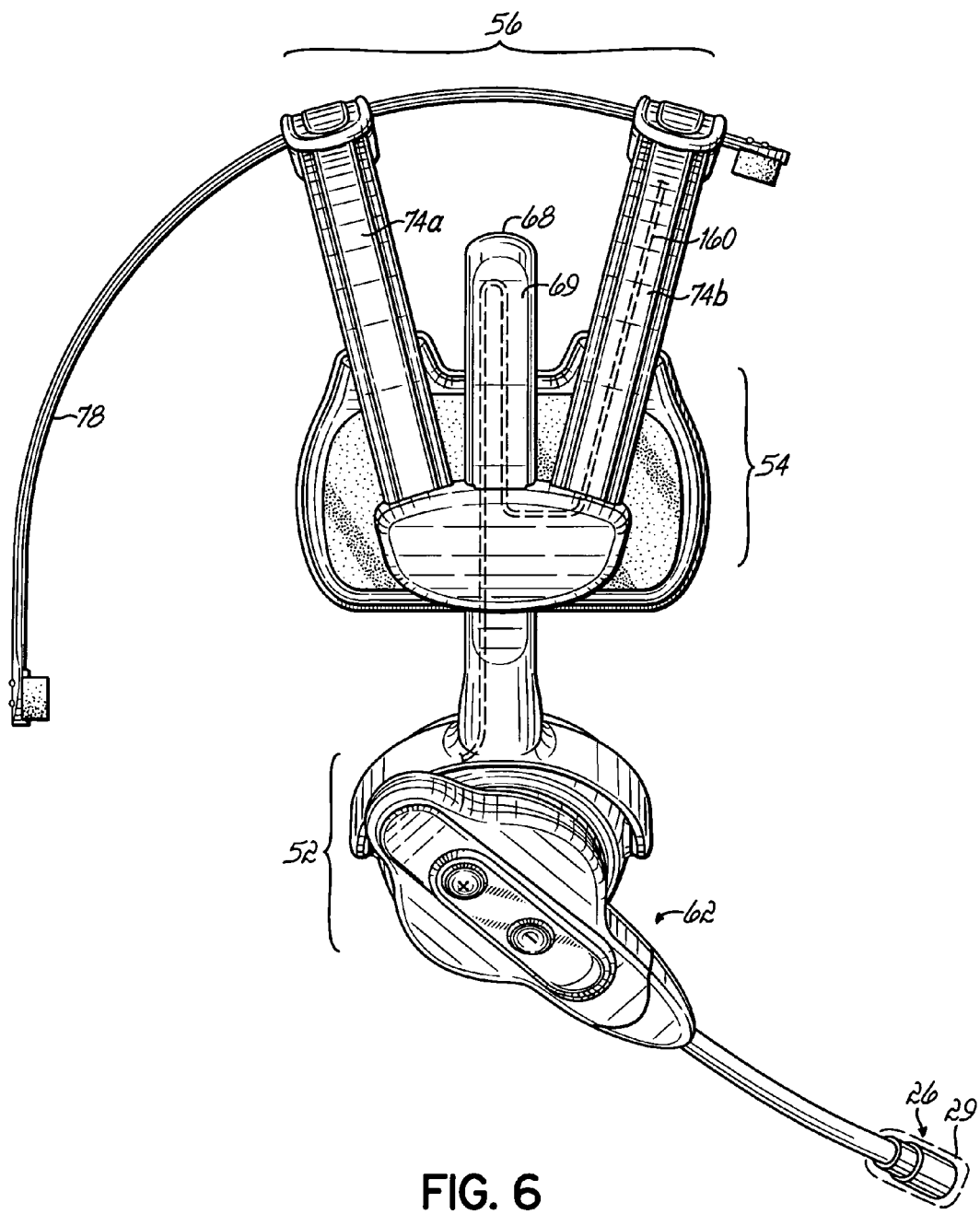
FIG. 6 is a side perspective view of a headset terminal in accordance with an embodiment of the present invention.

FIGS. 3 and 4 illustrate one aspect of the present invention and specifically disclose the inventive positional features of the controls 64 on the boom assembly 62. The controls are uniquely laid out to ensure that the controls 64 remain in a relatively similar position with respect to their operation by the user, regardless of the side of the head on which the earcup assembly 52 and boom assembly 62 are positioned. Furthermore, they spatially give the user an indication of their functions. As may be appreciated, a user utilizing the headset terminal 50 of the invention may want to position the earcup assembly such that it is either over the right ear or the left ear. That is, headset terminal 50 may be worn on the right side or left side of the head. To that end, the boom assembly 62 is rotatable in either direction as indicated by arrow 100 in FIG. 3. The controls 64 incorporate an (UP direction or function) button 102 and (DOWN direction or function) button 104. The UP direction or UP button 102 is indicated by a (+) while the DOWN direction or DOWN button 104 is indicated by a (−). For physical determination of the controls by the user, the buttons are also shaped differently as illustrated in FIGS. 3, 4, and 6. The UP button 102 generally has a convex shape or profile while the DOWN button 104 has a concave shape or profile. It may be appreciated, the shapes might be switched between the two buttons such that button 102 is concave and button 104 is convex. Furthermore, instead of having concave/convex the buttons may have other physical indications thereon which are sensed by the fingertips of the user, such as individual symbols or dots (e.g. Braille). The shape of the control buttons 102 making up control 64 is also illustrated in U.S. Design patent application Ser. No. 29/242,950 entitled CONTROL PANEL FOR A HEADSET, filed Nov. 16, 2005, which application is incorporated herein by reference in its entirety. Therefore, the boom assembly 62 of the present invention provides tactile controls 64 so that the user can operate the controls without seeing which buttons are engaged.

The UP and DOWN buttons 102, 104 are coupled to user interface components 20 and may provide a way of moving through various control menus provided by software that is run by the headset terminal 50. For example, the buttons might provide UP/DOWN volume control or allow UP/DOWN scrolling through a menu. The buttons might also have the functionality of turning the headset terminal ON and OFF or providing any of a variety of different controls for the headset terminal. Accordingly, while the buttons 102, 104 of controls 64 are indicated as UP/DOWN buttons herein, that terminology is not limiting with respect to their functionality. Furthermore, while two buttons are illustrated in the Figures of this application, multiple other control buttons or controls might be utilized in accordance with the principles of the present invention.

In accordance with another aspect of the present invention, the buttons 102, 104 are positioned on opposite sides of the boom assembly rotation axis 106 as illustrated in FIGS. 3 and 4. The construction of the boom assembly 62, as shown in FIG. 5 and discussed below, defines an axis of rotation 106, about which the boom assembly rotates. With the controls positioned as disclosed herein, when the boom assembly 62 is rotated about the axis 106 to operate either on the left side of the user's head or on the right side of the user's head, the orientation of the controls remains consistent on the boom assembly with respect to the head of the user. That is, the top or upper controls remain at the top and the lower controls remain at the bottom. In that way, once a user becomes familiar with the position of the controls and their operation, such familiarity will be maintained regardless of which side of the user's head the earcup structure and boom assembly is positioned. Furthermore, the spatial positioning of the control buttons is constant, and thus, the spatial position of the controls may be used to provide an indication of the function of the controls.

For example, as illustrated in FIG. 3, the boom assembly 62 is shown positioned to operate when the earcup structure 52 is positioned on the right side of a user's head. The user's mouth projects toward microphone 26. In such a position, the UP button 102 is vertically higher on the boom or more rearward of the boom arm 108 and microphone 26 than is the DOWN button 104 which is vertically lower or more forward along the boom assembly toward the microphone 26. As illustrated in FIGS. 3 and 4, the buttons are on either side of axis 106 such that when the boom assembly is rotated as illustrated by arrow 100 to the position in FIG. 4 for use on the left side of a user's head, the controls 64 maintain their similar orientation on the headset and their spatial positioning with the UP button 102 higher and the DOWN button 104 lower. Their relative position with respect to each other also provides an advantage as the UP button is on top and the DOWN button is on the bottom, relative the vertical. As such, when a user learns how to use the headset terminal 50 of the invention, it does not matter whether they position the boom assembly, earcup assembly, and microphone 26 on the right side or the left side of their head. The orientation of the controls remains the same and thus they are able to utilize the control buttons 102, 104 in the same fashion on either side of the head. Furthermore, the UP button stays on top and the DOWN button is on the bottom. As such, in addition to the unique shape of the control buttons that helps distinguish them from each other, their positioning on either side of the boom rotation axis and their spatial positioning relative each other provides a further desirable consistency such that operation of the headset terminal can be readily mastered regardless of how the headset is utilized.

Along those lines, the stabilizing strap 78 as illustrated in FIG. 2 can also slide forwardly or backwardly with respect to the transverse bands 74a and 74b and the clips 80 so that the headset terminal 50 may be utilized on either side of the head as desired. The microphone 26 utilized with the boom assembly might be any suitable microphone for capturing the speech of the user. For voice applications, and a voice-enabled headset terminal, it is desirable that the microphone 26 be of sufficient quality for capturing speech in a manner that is conducive to speech recognition applications. Other applications may not require a high quality microphone. A wind screen 29 might be used on microphone 26 and is removable to personalize the headset terminal to the user as discussed further below.

In one embodiment of the invention, an auxiliary microphone 27 might be utilized to reduce noise, to determine when the user speaks into the microphone 26 or for other purposes (see FIG. 1). The auxiliary microphone may be located as appropriate on the headset 50. For example, one embodiment of the invention might utilize the system set forth in U.S. patent application Ser. No. 10/671,140, entitled Wireless Headset for Use in Speech Recognition Environment, filed Sep. 25, 2003 or the system set forth in U.S. patent application Ser. No. 10/671,142, entitled Apparatus and Method for Detecting User Speech, filed Sep. 25, 2003, both applications being incorporated herein by reference in their entireties.

Figure 9:
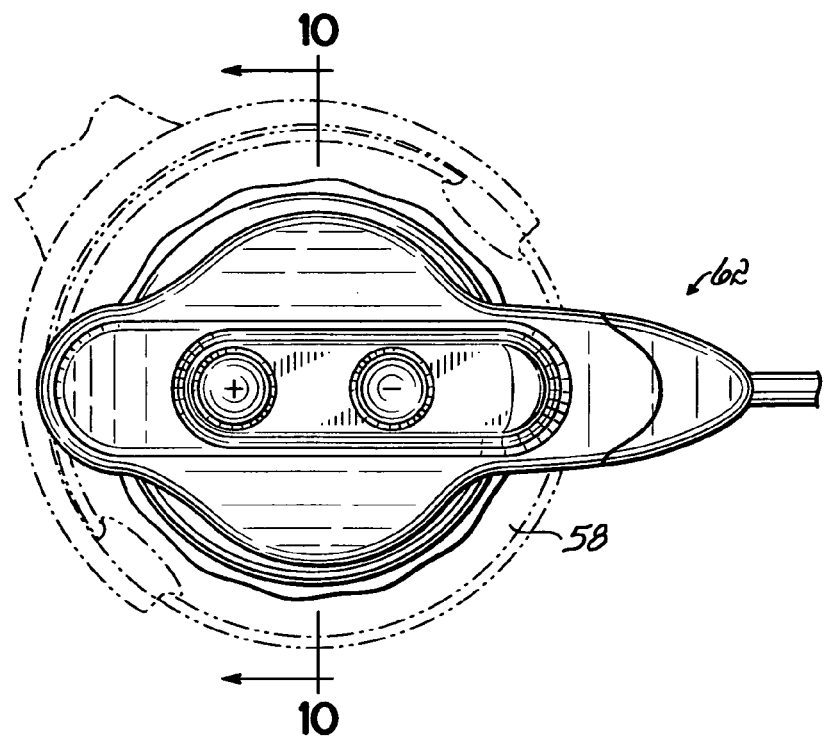
FIG. 9 is a side view of a portion of a boom assembly for a headset terminal in accordance with an embodiment of the present invention.
Figure 10:
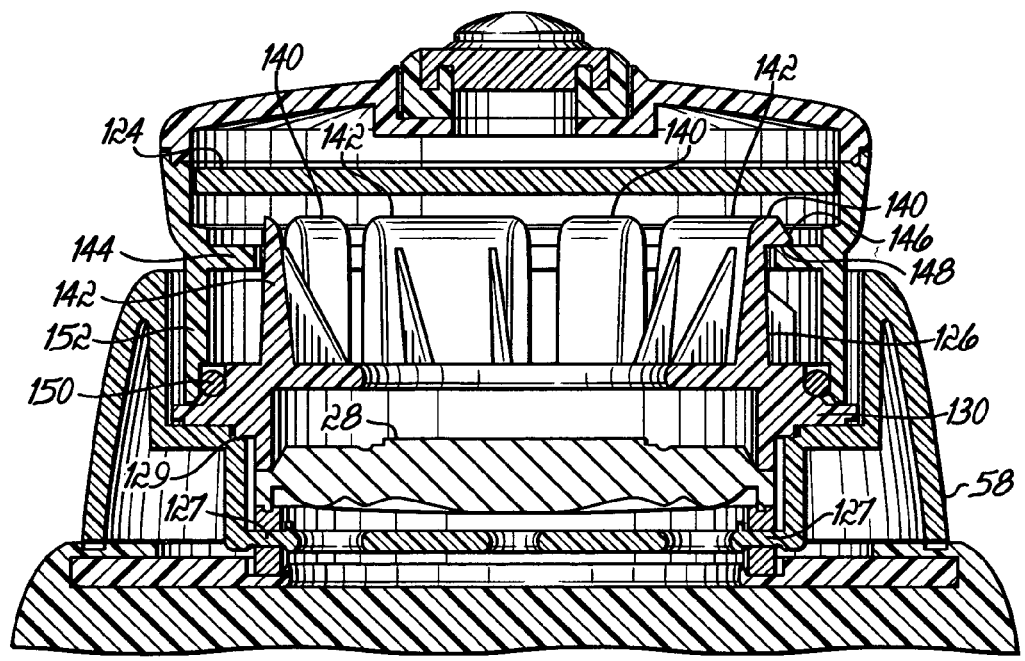
FIG. 10 is a cross-sectional view along lines 10-10 of the boom assembly of FIG. 9.
Figure 11:
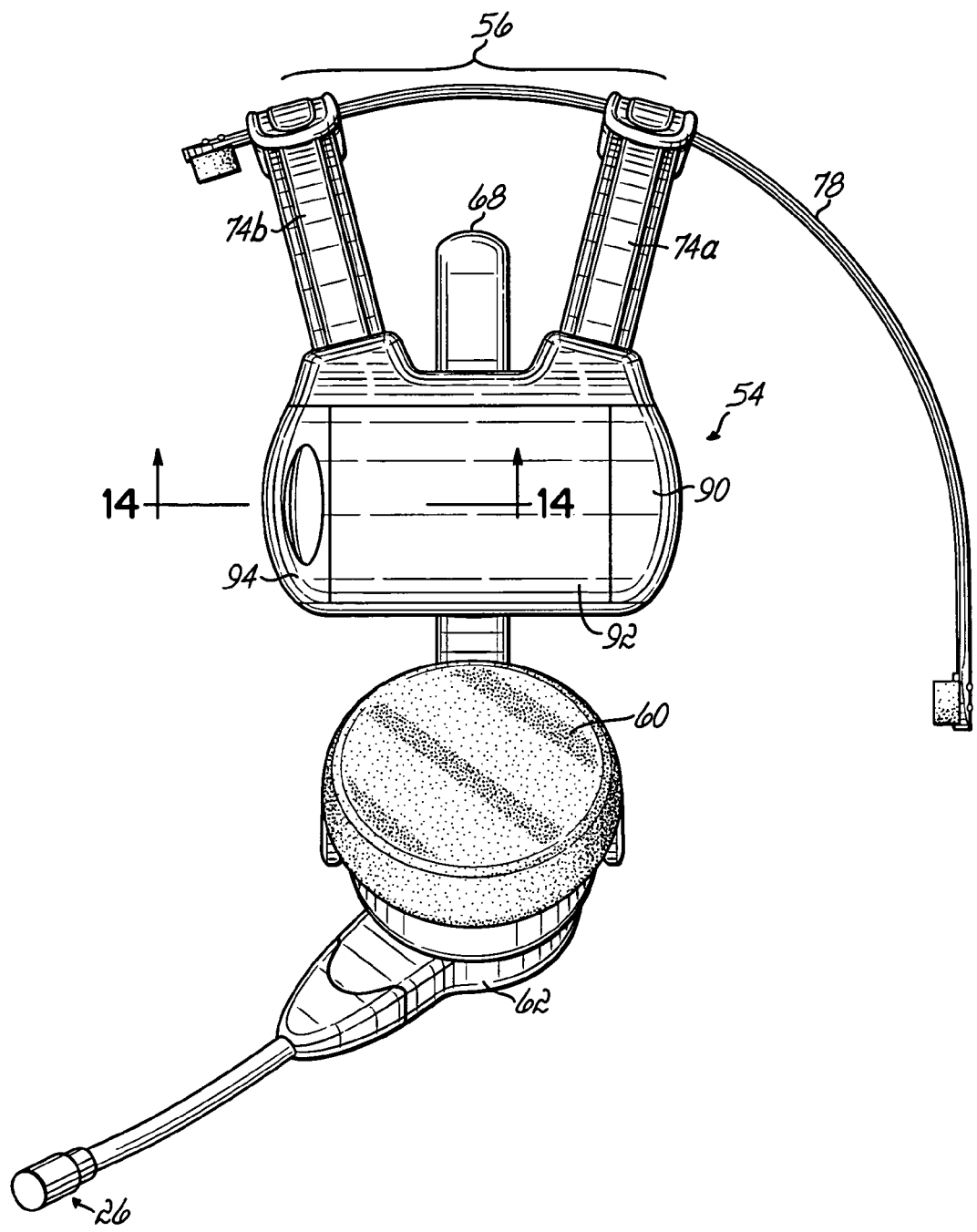
FIG. 11 is another side perspective view of a headset terminal in accordance with an embodiment of the present invention.

FIGS. 5, 9 and 10 illustrate other aspects of the present invention wherein the housing 58 which contains a speaker 28 may be rotatably coupled with the microphone boom assembly 62 quickly and easily with a minimal amount of separate fastening structures, such as screws, which may take up valuable printed circuit board (PCB) space that is necessary to house the desired electronics for the headset terminal 50. The advantage provided by the retainer structure of the earcup housing and boom assembly of the invention is particularly desirable when the headset terminal 50 is utilized for voice applications, wherein electrical components with sufficient processing power are necessary and circuit board space is at a premium. FIG. 5 illustrates portions of the earcup assembly 52 made up of a speaker module 120 and microphone boom assembly 62. FIG. 9 illustrates the microphone boom assembly 62 assembled with speaker module 120 incorporated in the housing 58. FIG. 10 shows a cross section of FIG. 9 illustrating the inventive snap-in relation between the boom assembly 62 and speaker module 120.

Turning again to FIG. 5, the speaker module 120 includes housing 58 which is shown in the Figures as generally circular in shape and includes appropriate openings 59 for rotatably mounting the housing 58 with yoke 70 as illustrated in FIG. 2. A speaker 28, which may also be circular, fits into the housing 58. Speaker 28 is appropriately coupled with circuit board 124 and appropriate audio input/output stage circuitry 14 in the boom assembly 62 for proper operation. A retainer 126 fits inside housing 58 as illustrated in FIG. 10. The retainer 126 captures speaker 122 between a bottom flange 127 of the housing 58 and a cooperating rim 130 of the retainer 126. (See FIG. 10). The retainer 126 is sonically welded to housing 58 at junctures 129.

Turning now to the boom assembly 62, one section of the boom housing 132 cooperates with another section 134 of the boom housing in a clamshell fashion to capture a printed circuit board 124 and an anchor structure 136 for the boom arm 108. A portion of the anchor structure is captured between the sides of the boom housing sections 132, 134. Controls 64 are appropriately and operationally coupled with the boom housing 132, 134 and printed circuit board 124 through a mounting bracket 65 as illustrated in FIG. 5.

Printed circuit board 124 contains one or more of the components illustrated on PCB 10 in FIG. 1. In one embodiment, PCB 124 might include all of the operational electronics of the terminal 50. Alternatively, there might be an additional PCB in the power source/electronics assembly 54 in addition to the battery pack 30. Also positioned on PCB 124 may be an antenna (not shown) for the WLAN radio 18 for transceiving frequencies associated with an 802.11 standard, for example. The antenna is located and configured so as to minimize RF transmissions to the head of the user.

The boom assembly housing, and particularly section 134 of the housing rotatably interfaces with the retainer 126 which is secured with earcup housing 58. More specifically, the present invention provides a snap retaining arrangement which secures the rotating boom assembly 62 with adequate bearing surfaces in the earcup housing 58. The present invention does so without shoulder screws, washers, or other elements which have traditionally resided in or through valuable circuit board space. The boom assembly 62 readily snaps in place with housing 58 and freely rotates therewith as necessary for utilization of the headset terminal 50 on either the right side of the head or the left side of the head. Furthermore, the rotating boom assembly provides adjustment of the microphone 66 with respect to the user's mouth.

More specifically, referring to FIG. 10, the snap retainer 130 incorporates a plurality of flexible snaps 140 positioned circumferentially around retainer 126. Structural walls 142 separate the snaps 140 interspersed therebetween, as illustrated in FIGS. 5 and 10. The boom assembly, and specifically body section 134 includes an inwardly extending flange 144 which cooperates with the snaps 140 to retain the boom assembly 62 and also to provide a bearing surface for rotation of the boom assembly. Referring to FIG. 10, the retainer snaps 140 include an angled surface 146 which engages flange 144 when the boom assembly 62 is pushed into earcup housing 58. The snaps 140 are somewhat elongated from the base or flange 130 of retainer 126 and thus flex inwardly to allow the passage of flange 144 of the boom assembly. The snaps 140 then snap back to capture flange 144 and thereby capture the boom assembly. Opposing surfaces of the snaps 140 and flange 144 provide bearing surfaces at juncture 148 as illustrated in FIG. 10. An O-ring 150, such as a rubber O-ring, is positioned between flange 130 of retainer 126 and a collar portion 152 of the boom housing section 134. The O-ring 150 provides a suitable seal for the electronics of PCB 124 and the retainer snaps 140 provide retention and easy rotation for the rotating boom assembly.

The unique snap fit provided by the invention eliminates the screws, washers and other fasteners engaging the circuit board 124. Thus the entire board may be used for electronic components. Therefore, a greater amount of the circuit board may be used for the processing circuitry 12, such as for voice processing in accordance with one aspect of the invention. The invention thus provides sufficient board space while keeping the headset terminal 50 small and lightweight. Component costs are further reduced, as are assembly costs and time. The boom assembly 62, housing 58 and other components might be made of a suitable, lightweight plastic.

Figure 7:
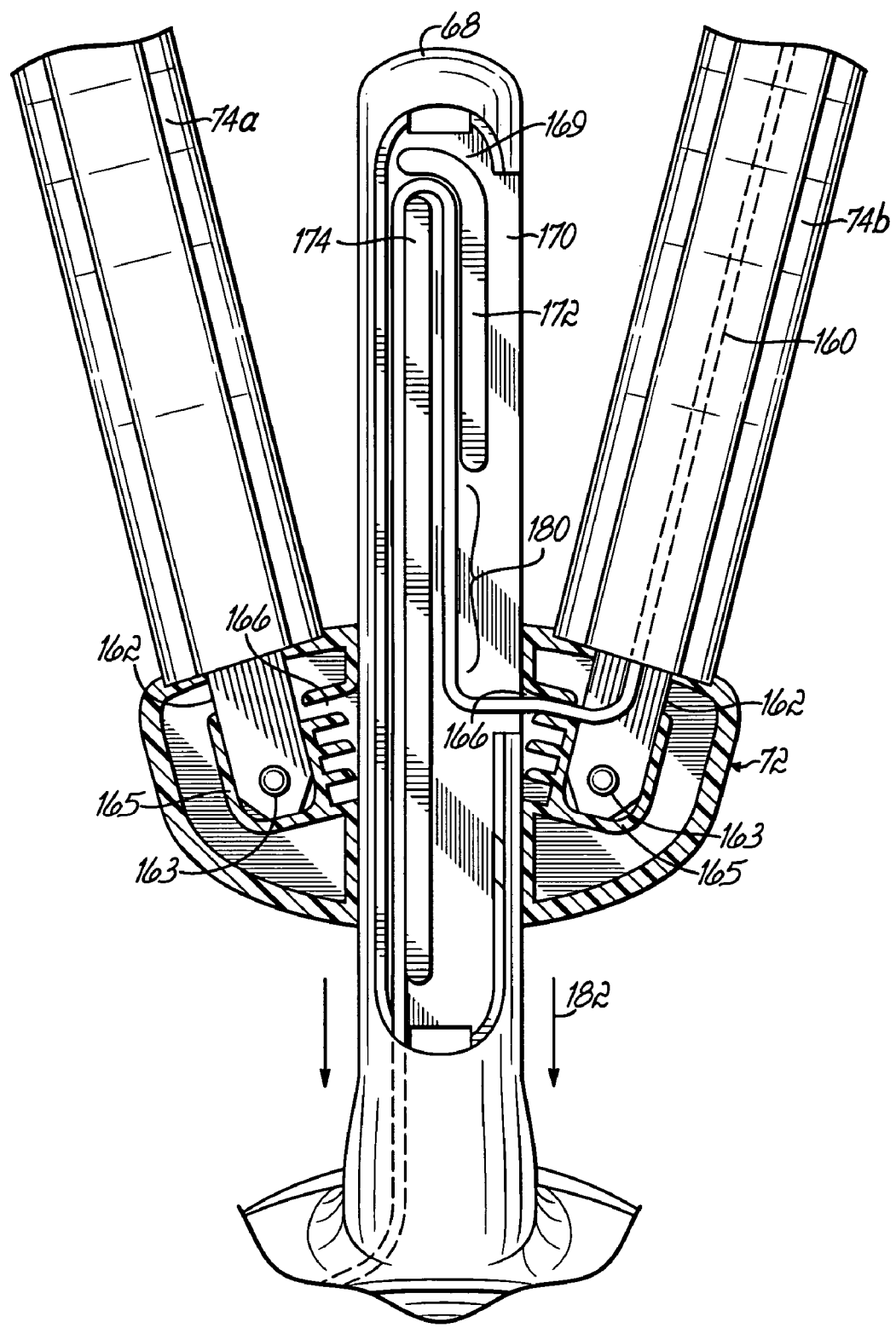
FIG. 7 is a side view, in partial cutaway, of a headband assembly for a headset terminal in accordance with an embodiment of the present invention as shown in FIG. 6.
Figure 8:
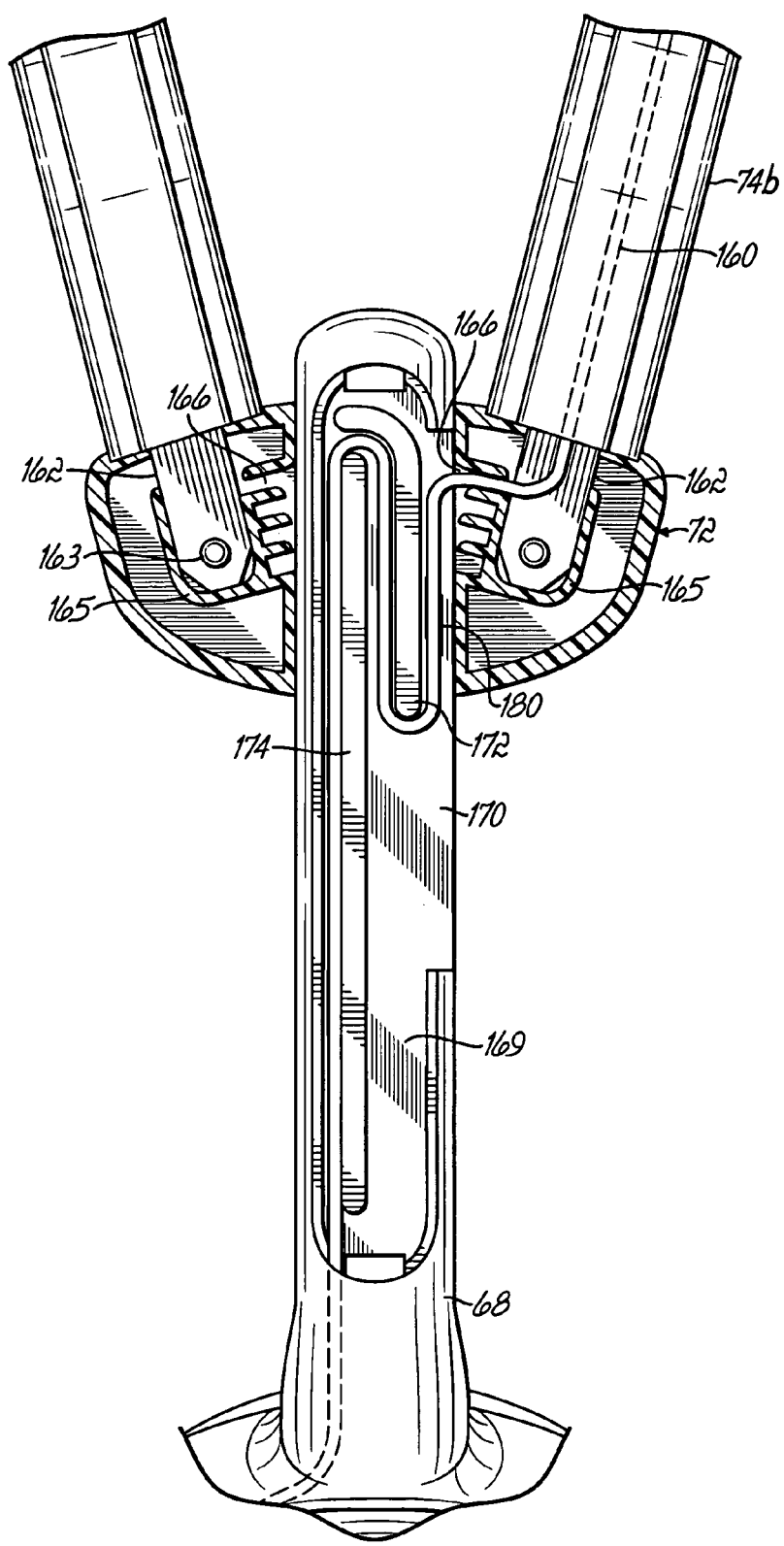
FIG. 8 is another side view, in partial cutaway, of a headband assembly for a headset terminal in accordance with an embodiment of the present invention as shown in FIG. 6.

Turning now to FIGS. 6, 7 and 8, another aspect of the present invention is illustrated involving the operation of the adjustable sliding arm 68 of the headset terminal 50. Specifically, in accordance with another aspect of the present invention, the headset terminal 50 provides interconnectibility between the various electronics, processing circuits, and operational components of the terminal while maintaining a clean and desirable aesthetic look to the headset terminal 50 and size/comfort adjustability of the headband assembly 56.

Specifically, as illustrated in FIGS. 6-8, the headset terminal 50 incorporates an earcup assembly 52 and a power source/electronics assembly 54 on opposite sides of the headband assembly 56. Generally, the earcup assembly 52 and the power sources/electronics assembly 54 collectively incorporate printed circuit boards, electrical components, power sources such as batteries, and other devices which utilize electrical signals. As such, the operability of the headset terminal 50 is dependent upon the interconnection between these various electrical components, circuit boards, and power source(s). To that end, signal wires, power wires, and other suitable cabling must be run from one side of the headset terminal to the other side. Furthermore, because of the adjustability of the headset terminal 50 and the movement of the earcup assembly 52 and sliding arm 68, the cabling must be dynamically adjustable in length for a proper headset fit and proper operation, without disconnections. Prior art headsets incorporate dual or single cables which extend from either side of the headset, and thus are exposed and may become tangled. As noted, this is particularly unsuitable for the wireless headset terminal 50 of the invention which is worn by a mobile and moving user. Alternatively, where cables have been incorporated to span between the sides of a headset, they have still been exposed, thus reducing the aesthetic appeal of the headset. The present invention addresses the cable interconnection between the various components on the sides of the headset in a hidden or covered fashion, while still maintaining dynamic adjustability of the earcup and the headset fit.

Referring now to FIG. 6, the headset terminal 50 is shown having wires or cables 160 which pass across the headband assembly 56 between the power source/electronics assembly 54 and earcup assembly 52. While a single wire or cable 160 is illustrated in the drawing FIGS. 6-8, it will be appreciated that the single cable 160 may generally include multiple conductors or multiple wires or there may be a plurality of cables. Therefore, a single cable is shown for illustrative purposes only. As such, the present invention is not limited to a single cable or conductor spanning the headband assembly. In one embodiment of the invention, cable 160 may include power lines coupling the electronics of the PCB 124 of earcup assembly 52 with a power source, such as a battery 92 in assembly 54. Alternatively, various electronics might be utilized in assembly 54 along with a power source and cable 160 may provide interconnections between components of the power source/electronic assembly 54 and the earcup assembly 52.

In accordance with one aspect of the invention, the headset terminal 50 is configured so that the cable 160 articulates completely within the structures of the headset terminal and is hidden thereby. The effective length of the cable 160 may dynamically change while adjusting the headset fit due to the unique configuration of saddle 72 and the sliding arm 68 in hiding and guiding the cable, and providing protection and control of the cable dynamics. Referring to FIG. 6, cable 160 may be shown passing from the power source assembly 54 over the transverse band 74b, through saddle 72, along the sliding arm 68, and then down to the earcup assembly 52. Cable 160 is appropriately coupled with the electronic components in the earcup assembly 52 (not shown).

FIGS. 7 and 8 illustrate the internal configuration and dynamics of the saddle 72 and sliding arm 68 as the fit of the headset terminal 50 is adjusted and the length of cable 160 dynamically varied. FIG. 7 illustrates the sliding arm in position with the earcup assembly proximate an uppermost position on the headset. Transverse bands 74a, 74b include band structures such as metal straps 162 that are anchored at suitable anchoring points 163 in the saddle and are appropriately anchored with assembly 54 on the other side of the headset. The fit of the headset is determined by the adjustable height of the earcup assembly 52 as provided by movement of sliding arm 68 in the saddle 72. The anchor points 163 for the bands 162 are located in terminal portions 165 formed in the saddle 72. The terminal portions 165 form passages 166 for the passage of cable 160 between the transverse bands 74a, 74b and the sliding arm 68. A cavity 169 is formed in the sliding arm. The cable is contained, in an articulated fashion, in cavity 169, as shown in FIGS. 7 and 8. Formed in sliding arm 68 is an elongated slot 170, which extends along the cavity and allows passage of cable 160 from transverse band 74b over to the cavity 169 of sliding arm 68 through passage 166. Slot 170 has a defined length, along the length of the sliding arm, so that as the sliding arm is moved to a lowermost position as illustrated in FIG. 8, the crossover of cable 160 is maintained through passage 166 as shown in FIG. 8. Guide structures 172, 174 guide cable 160 along the sliding arm 68 as it articulates due to the movement of sliding arm 68 within the saddle 72. As is illustrated in FIG. 7, when the earcup assembly 52 is proximate its uppermost position, a significant amount of cable 160 is not utilized and thus must be stored within the headset assembly. That is, the effective length of the cable is shorter. Previous headsets leave cables exposed and/or loose around the headset, ruining the aesthetic appeal of the headset, and also exposing cables that may be caught or snagged. Due to the cooperation between the guide structures 172, 174, the cable within the sliding arm 68 is wrapped back on itself as illustrated in FIG. 7 so that the excess portion of cable indicated by reference numeral 180 is maintained within the sliding arm 68. FIGS. 7 and 8 illustrate the internal configuration of sliding arm 68 and expose the guide structures 172, 174. As may be seen, the cable 160 wraps back on itself multiple times around the multiple guide structures 172, 174. However, as illustrated in FIGS. 2 and 6, a cover 69 extends along a portion of sliding arm 68 and thereby covers cavity 69 and the articulated cable 160 and the guide structures 172, 174. As such, the cable 160 is generally completely hidden from view regardless of the position of the earcup.

When the headset terminal 50 is adjusted so that the earcup assembly is moved as shown by reference arrows 182 in FIG. 6, to the lowermost position illustrated in FIG. 8, the slack cable portion 180 is taken up by guide structure 172 to allow the sliding arm 68 to slide through saddle 72 as shown. In FIG. 7, cable 160 crosses over through passage 166 at a lower end of the slot 170, but when the sliding arm is extended, the cable 160 crosses over into the sliding arm proximate the upper end of the slot 170. That is, in FIG. 7, the passage 166 is located proximate the lower end of slot 170, and in FIG. 8, passage 166 is located proximate the upper end of slot 170. In that way, the headset terminal 50, and specifically the earcup assembly 52 may be dynamically adjusted, with the dynamic lengthening and shortening of the effective length of the cable 160 being readily handled within the sliding arm 68 and saddle 72 without any significant exposure of the cable. The aesthetics of the headset terminal are thus maintained and the cable is not exposed to be caught or snagged.

Referring again to FIG. 7, if the earcup assembly 52 is again moved with the sliding arm 68 to an uppermost position, the cable slack portion 180 is maintained within the sliding arm and generally out of view. Thus, the cable dynamics are protected and controlled and a high aesthetic quality is achieved by hiding the cable and eliminating any strap openings within the headband assembly 56.

FIGS. 11-15 illustrate another inventive aspect of the headset terminal 50 of the invention. Generally, the embodiment of headset terminal 50 that is a self-contained mobile terminal or computer for handling a variety of tasks will require a power source. This is particularly true for one embodiment of the headset terminal 50, wherein it is a mobile terminal with speech capabilities, including speech recognition and speech synthesis, for speech enabled work applications. Generally, the portable power source is a battery 92.

Figure 12:
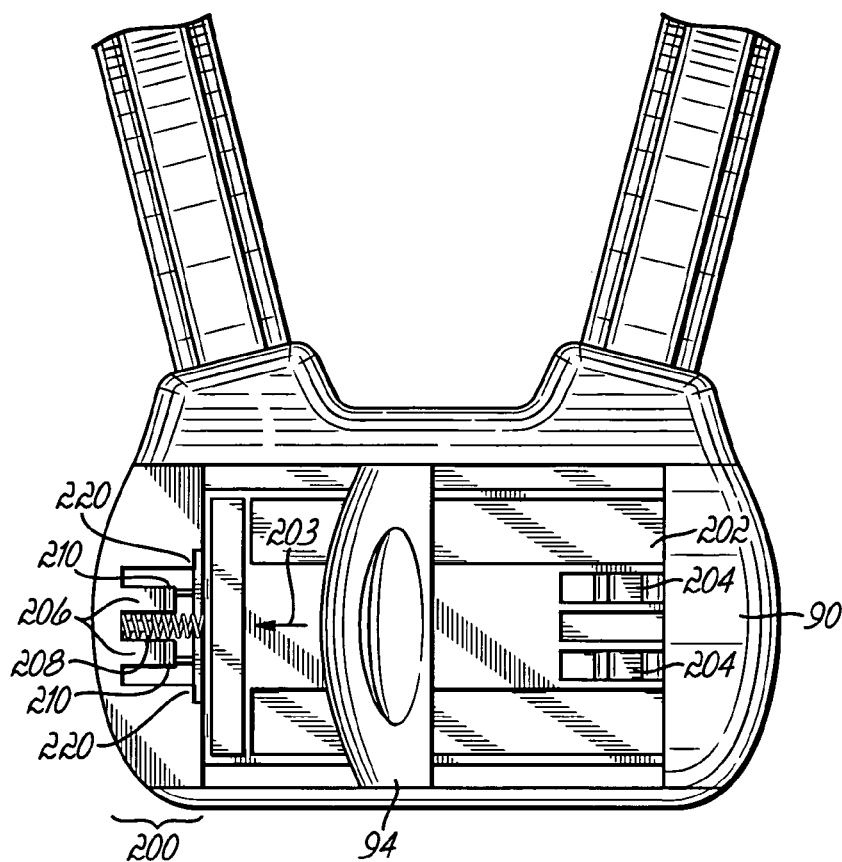
FIG. 12 is a side view of portion of a headset terminal in accordance with an embodiment of the present invention as shown in FIG. 6.
Figure 13A:
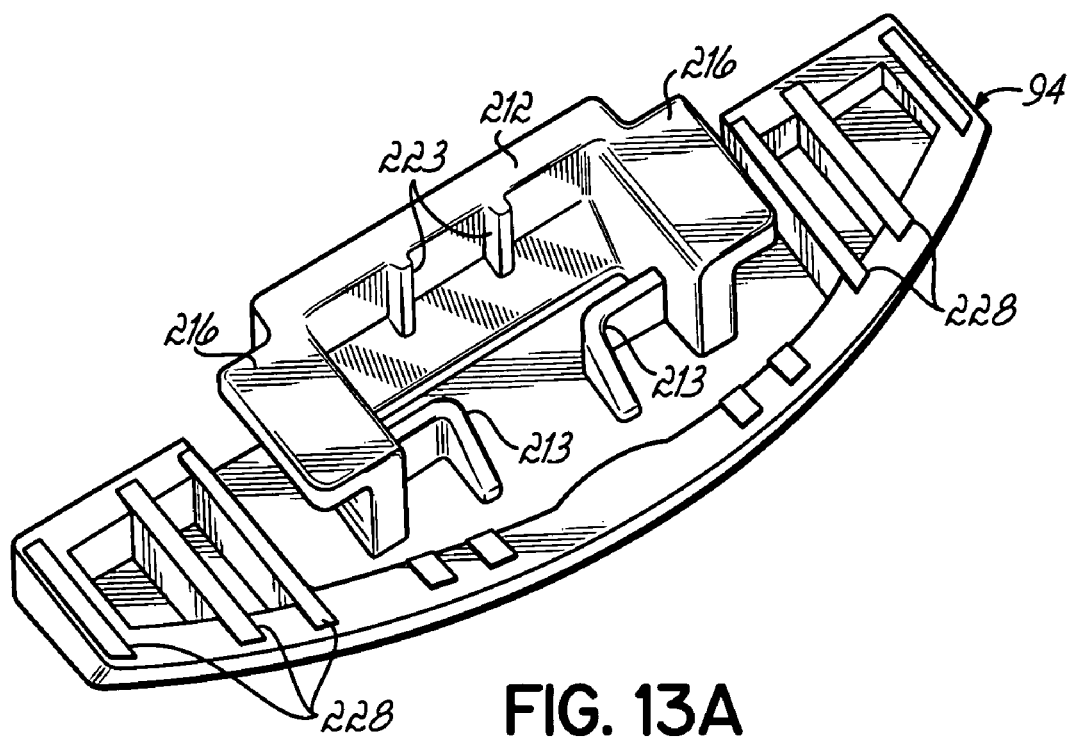
FIG. 13A is a bottom perspective view of a latch structure in accordance with an embodiment of the present invention.
Figure 14:
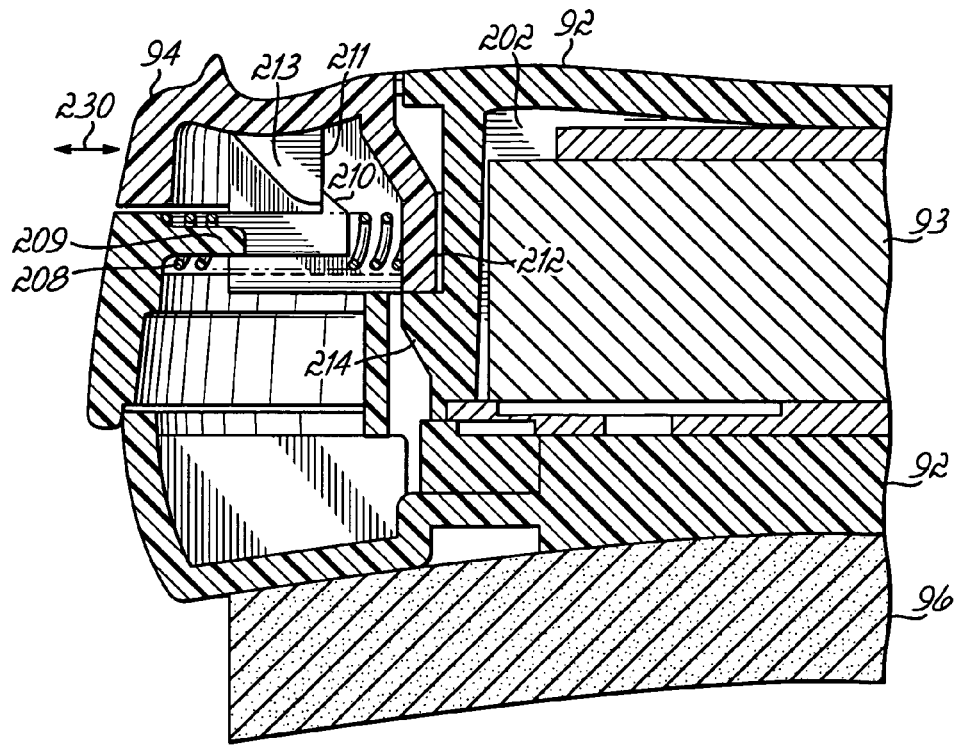
FIG. 14 is a cross-sectional view along lines 14-14 of the headset terminal of FIG. 11 showing a latch engaging a battery.
Figure 15:
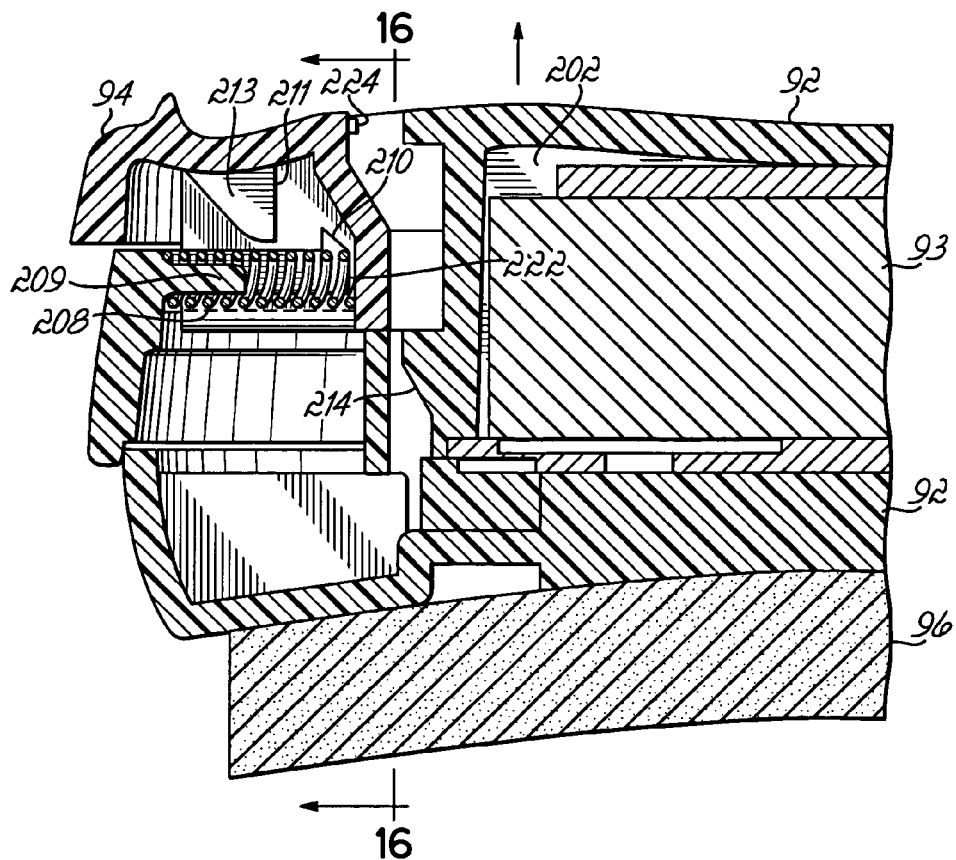
FIG. 15 is another cross-sectional view similar to FIG. 14 showing the latch disengaged.

Referring to FIG. 11, the power source/electronic assembly 54 of headset terminal 50 includes a housing 90 containing a battery 92 and any other suitable electronics as noted above. A latch 94 holds battery 92 within housing 90. The latch may be actuated for allowing removal and replacement of battery 92. In accordance with one aspect of the invention, latch 94 utilizes a unique combination of elements that allows it to snap into housing 90 in a simple yet robust fashion and to operate in a sliding fashion by sliding longitudinally with respect to housing 90. FIG. 12 illustrates housing 90 with the battery 92 removed. At one end of housing 90 a latch retention assembly 200 is formed to hold or retain latch 94 in an operable fashion. Battery 92 fits into an appropriate cavity 202 formed in housing 90 and interfaces with electrical contacts 204, or other electrical interconnections. While in FIGS. 12, 14 and 15, the battery 92 is shown taking up significantly all the space of cavity 202, other electronics, such as a PCB with various components, might also be mounted in cavity 202. Latch retention assembly 202 includes latch retention snaps 206 on either side of a spring 208 as illustrated in FIG. 12. Referring to FIGS. 14 and 15, the latch retention snaps include up-struck hook portions 210 that capture snap retention ribs on the underside of latch 94 (see FIG. 13a).

Figure 16:
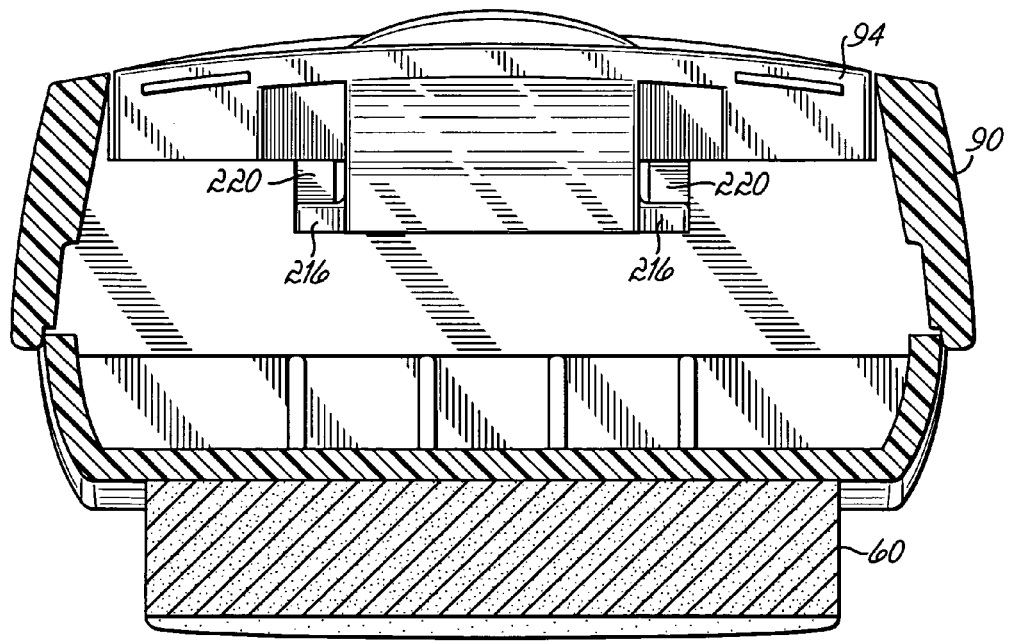
FIG. 16 is a cross-sectional view along lines 16-16 of the headset terminal of FIG. 15.
Figure 13:
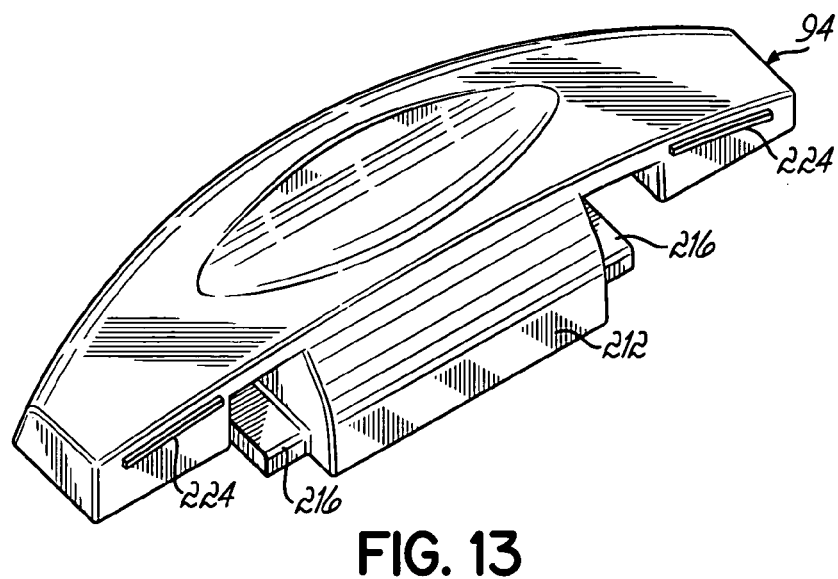
FIG. 13 is a top perspective view of a latch structure in accordance with an embodiment of the present invention.

Referring to FIG. 13, latch 94 includes a catch structure or catch 212. As illustrated in FIG. 14, when the latch 94 is in a "latch" position to capture or latch the battery 92, the catch 212 engages an appropriately formed shoulder 214 on the battery 92. As may be appreciated, battery 92 may include an outer housing and an internal battery cell 93 as shown in cross-section in FIGS. 14 and 15. Also, as noted, some electronics might be used in the space shown occupied by cell 93. The latch retention assembly 200 holds latch 94 in place, and thus the latch 94 keeps battery 92 in proper position within housing 90. Referring again to FIGS. 12 and 13, latch 94 may be positioned to span transversely across the battery cavity 202. The latch is then slid in the direction shown by reference arrow 203 to engage the latch retention assembly 200. In doing so, retention tabs 216 which extend outwardly from either side of the catch 212, slide underneath respective rail surfaces 220 on either side of the snaps 206. Surfaces 220 are part of the latch retention assembly 200 (See FIG. 16). The cross-section of FIG. 16 illustrates the retention tabs captured below the rail surfaces 220, thereby holding latch 94 downwardly within housing 90. Referring again to FIG. 12, as the latch slides toward the latch retention assembly 200, retention tabs 216 slide under rail surfaces 220 and the snap retention ribs 213 (See FIG. 13A) engage the snaps 206 and are captured by engagement of the hook portions 210 with a stop surface 211 of the snap retention ribs. A spring surface 222 on the backside of catch 212 bears against spring 208. Ribs 223 on either side of surface 222 keep the spring 208 aligned. Spring 208 drives latch 94 to the operable latching or latch position as illustrated in FIG. 14. In that position, the catch 212 bears against shoulder 214 to keep the battery 92 in place. To unlatch battery 92 so that it can be removed and/or replaced, latch 94 is simply slid away from battery 92 against spring 208 to an "unlatch" position, as illustrated in FIG. 15. The battery 92 may then be removed. Spring 208 is kept in position by a spring holder post 209 as illustrated in FIGS. 14 and 15. When released, latch 94 then snaps back in its latch or engagement position as illustrated in FIG. 14. Spring 208 keeps it in that latch position and engagement between the hook portion 210 of snaps 206 and stop surface 211 of the snap retention ribs 213 keep the latch 94 from sliding out of position and away from housing 90 when no battery is in position. As illustrated in FIG. 13, gap spacers 224 might be used for proper spacing of the latch as it engages the battery as shown in FIG. 14. Since the latch will be operated multiple times during its life, wear ribs 228 might be utilized to absorb some of the wear and keep the latch operating properly (See FIG. 13A).

The snap retention ribs 213 and specifically the stop surfaces 211 are normal to the sliding plane of the latch as illustrated by reference arrow 230 in FIG. 14. The snaps 206 of the main housing, and specifically the hook portions 210 have surfaces that are also normal to the sliding plane 230. As noted, the surfaces of hook portions 210 engage the stop surfaces 211 of the ribs 213 and retain the latch in the nominal position. The spring force of spring 208 forces the latch 94 to rest against the snaps 206 in the sliding plane 230. The retention tabs 216 are captured by the rail surfaces 220 of the housing to provide the primary load path for the mass of the battery 92 which is held by the latch. As described above, the latch is assembled by simply aligning the retention tabs 216 with rail surfaces 220 and snapping the latch into place via retention ribs 213 and snaps 206.

In another aspect of the invention, the modular architecture of wireless headset terminal 50 allows the separation of the "personal" components of headset terminal 50, i.e., those that touch the user's head, ears, or mouth, from the non-personal, expensive electronics since the headset is a unitary system with no separate body-worn terminal.

In single shift operations, the entire wireless headset terminal 50 is placed in the charger while not in use. In multi-shift operations, the personal components can be removed from the terminal 50 so the terminal might be reused. Referring to FIG. 2, the pads 60, 96 and/or 76 might be removed, along with the windscreen 29 on the microphone 26. A new user would then personalize the terminal with their personal components.

In use, one typical operation of terminal 50 might be as follows. At the beginning of a shift, a user selects any available terminal at their workplace from a pool of terminals. The user then assembles their personal items to the earcup assembly and microphone boom assembly. In particular, the user might secure pad 60 to the earcup assembly. A fresh battery 92 might be installed and latched. The user may then install their microphone windscreen 29 onto microphone 26 of microphone boom assembly 62. Once all assembly is complete, the user places wireless headset terminal 50 on their head, such that earpad 60 is in contact with their ear, microphone 26 is positioned in close proximity to their mouth, and headpad 96 is in contact with their head. The user then activates terminal 50 by use of controls 64 of user interface 20 and, as a result, power is delivered from battery 92 to wireless headset terminal 50. Subsequently, program and product data may be loaded from a central system (not shown) into terminal 50 via the Wi-Fi radio aspects. Voice commands are processed by CPU 12 and the appropriate response is generated, which is directed digitally to audio input/output stage 14. Audio input/output stage 14 then converts the digital data to an analog audio signal, which is transmitted to speaker 28. Subsequently, the user hears spoken words through speaker 28 and takes action accordingly. The user may then speak into microphone 26, which generates an analog audio signal, that is then transmitted to audio input/output stage 14. Audio input/output stage 14 then converts the analog signal to a digital word that represents the audio sound received from microphone 26 and, subsequently, CPU 12 processes the information. During the operation of headset terminal 50, data within memory 16 or CPU 12 is being updated continuously with a record of task data, under the control of CPU 12. Furthermore, radio transmission occurs between Wi-Fi radio 18 and a central computer (not shown) through a wireless RF network for transmitting or receiving task data in real time or batch form. When the user has completed their tasks, such as at the end of a shift, the user removes headset terminal 50 from their head and deactivates the headset with the controls 64.

In one embodiment, wireless headset terminal 50, in addition to the noted features above, provides the following features:

Instant response from full, on-board speech recognition and synthesis, powered by a 600 MHz Intel® XScale™ processor Fully secure, standards-based host computer communications, with integrated support for both 802.11b and 802.11g Support for a wide variety of Bluetooth-compatible, body-worn wireless peripherals, through integrated Bluetooth V1.2 hardware (optional)

User performance and productivity maximized through outstanding ergonomics, combined with maximum durability for rugged environments Full shift operation, combined with absolute minimum weight A secondary microphone, integrated into the earpiece, provides even greater immunity to background noise, which further enhances user productivity Integration of headset and electronics eliminates all the issues associated with wired or wireless connections between hand-held or belt-mounted devices and headsets.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details of representative apparatus and method, and illustrative examples shown and described. Accordingly, departures may be made from such details without departure from the spirit or scope of applicant's general inventive concept.

What is claimed:

1. A headset comprising:
    a headband assembly for spanning across the head of a user; an earcup assembly coupled proximate one end of the headband assembly and including: a speaker for playing audio speech signals to a user;
    a microphone boom assembly including a microphone for capturing speech of a user, the microphone boom assembly rotatably coupled in the earcup assembly to rotate on a generally horizontal axis;
    controls mounted on the microphone boom assembly to rotate with the assembly, the controls including elements mounted on opposite sides of the axis that maintain a consistent orientation on the boom assembly with respect to the head of a user when it is rotated in either direction;
    so the headset may be used on either side of a user's head.

2. The headset of claim 1 further comprising a power source assembly coupled proximate the other end of the headband assembly and configured to fit against a side of the user's head opposite the earcup assembly.

3. The headset of claim 2 further comprising processing circuitry positioned in at least one of the earcup assembly and the power source assembly, the processing circuitry including speech processing circuitry for recognizing speech captured by the headset from a user and for synthesizing speech to a user to provide a speech interface to communicate activity information with a user and collect data from a user.

4. The headset of claim 1 further comprising control buttons, at least one control button positioned on opposite sides of the rotational axis from each other.

5. The headset of claim 4 wherein the at least one control button on one side of the axis is shaped differently from the at least one button on the opposite side of the axis.

6. The headset of claim 4 wherein the at least one control button on one side of the axis is shaped with a convex shape and the at least one button on the opposite side of the axis is shaped with a concave shape.

7. The headset of claim 1 wherein one of the controls is configured to provide an UP function and one of the controls is configured to provide a DOWN function, the UP function control being located vertically above the DOWN function control.

8. A headset comprising:
    a headband assembly for spanning across the head of a user; an earcup assembly coupled proximate one end of the headband assembly and including a housing with a speaker and a microphone boom assembly with a microphone;
    a retainer being secured in the housing and including a plurality of snaps positioned around the retainer;
    the boom assembly including a flange that is captured by the snaps so that the boom assembly snaps configured for snapping together with the housing for rotatably coupling the boom assembly in the earcup assembly to rotate on an axis.

9. The headset of claim 8 wherein the boom assembly includes a circuit board for supporting circuit components for the headset.

10. The headset of claim 8 further comprising a power source assembly coupled proximate the other end of the headband assembly and configured to fit against a side of the user's head opposite the earcup assembly.

11. The headset of claim 10 further comprising a circuit board with circuit components thereon positioned in at least one of the earcup assembly and the power source assembly.

12. The headset of claim 11 wherein the circuit components include processing circuitry including speech processing circuitry for recognizing speech captured by headphone from a user and for synthesizing speech to a user to provide a speech interface.

13. An adjustable headset comprising:
    a headband assembly for spanning across the head of a user;
    an earcup assembly coupled proximate one end of the headband assembly including a speaker and microphone;
    a power source assembly coupled proximate the other end of the headband assembly;
    the headband assembly including at least one transverse band and a sliding arm that is slidingly coupled with the transverse band, the earcup assembly being coupled to the sliding arm for dynamically adjusting the position of the earcup assembly with respect to the headband assembly;
    a guide structure positioned in a hidden cavity inside of the sliding arm;
    an elongated cable extending between the power source assembly and earcup assembly along the transverse band, the cable articulating inside of a the hidden cavity and wrapping back on itself around the guide structure to remain hidden when the earcup assembly is adjusted and the effective length of the cable varies;
    to provide a desirable aesthetic to the adjustable headset.

14. The adjustable headset of claim 13 wherein the earcup assembly includes a rotatable microphone boom assembly for mounting the microphone.

15. The adjustable headset of claim 13 further comprising a plurality of guide structures positioned in the hidden cavity, the articulating cable wrapping back on itself multiple times around the guide structures.

16. The adjustable headset of claim 13 further comprising a slot extending along the length of the sliding arm, the slot extending along the cavity for allowing passage of the cable from the transverse band to the cavity for articulating in the cavity when the position of the earcup is adjusted.

17. The adjustable headset of claim 13 further comprising a saddle coupled to an end of the transverse band, the sliding arm operable to slide in the saddle to adjust the position of the earcup.

18. The adjustable headset of claim 17 wherein the saddle includes a passage for directing the cable between the transverse band end and the sliding arm.

19. The adjustable headset of claim 13 further comprising a cover for covering the cavity and the articulating cable in the cavity.

20. The adjustable headset of claim 13 further comprising a plurality of transverse bands for spanning side by side across the head of a user.

21. The adjustable headset of claim 20 further comprising a stabilizing strap extending between the plurality of transverse bands for stabilizing the headset.

22. A headset comprising:
   a headband assembly for spanning across the head of a user;
   an earcup assembly coupled proximate one end of the headband assembly;
   a power source assembly coupled proximate the other end of the headband assembly and including a housing and a power source element coupled to the earcup assembly;
   a latch slidable on the housing between a latch position and an unlatch position and configured to secure the power source element with the housing in the latch position;
   at least one latch retention snap coupled to the housing and configured to engage a retention rib on the latch so that the latch may be slid onto the housing and snapped into position to secure it with the housing.

23. The headset of claim 22 further comprising a plurality of retention snaps and respective retention ribs for securing the latch.

24. The headset of claim 22 wherein the earcup assembly includes a speaker, a microphone and processing circuitry for operating the headset, the power source element coupled to the processing circuitry.

25. The headset of claim 22 wherein a cavity is formed in the housing to receive the power source element, the latch secured proximate one end of the cavity.

26. The headset of claim 22 wherein the latch further comprises retention tabs, the housing including rail surfaces that overlie the retention tabs when the latch is secured to the housing, the tabs and rail surfaces providing a toad path for the power source element secured with the housing by the latch in the latch position.

* * * * *

UNITED STATES PATENT AND TRADEMARK OFFICE
CERTIFICATE OF CORRECTION

PATENT NO. : 7,885,419 B2
APPLICATION NO. : 11/347979
DATED : February 8, 2011
INVENTOR(S) : James Wahl et al.

Page 1 of 1

It is certified that error appears in the above-identified patent and that said Letters Patent is hereby corrected as shown below:

In the Claims:

In Column 18, Lines 19-20, CLAIM 8, reads ". . . so that the boom assembly snaps configured for snapping together with the . . ." and should read --. . . so that the boom assembly is configured for snapping together with the . . .--.

In Column 18, Line 56, CLAIM 13, reads ". . . inside of a the hidden cavity . . ." and should read --. . . inside of a hidden cavity . . .--.

In Column 20, Line 24, CLAIM 26, reads ". . . providing a toad path for . . ." and should read --. . . providing a load path for . . .--.

Signed and Sealed this
Seventeenth Day of December, 2013

Margaret A. Focarino
*Commissioner for Patents of the United States Patent and Trademark Office*